(12) United States Patent
Park et al.

(10) Patent No.: US 10,348,533 B2
(45) Date of Patent: Jul. 9, 2019

(54) METHOD AND DEVICE FOR TRANSMITTING PAY LOAD SEQUENCE

(71) Applicant: SAMSUNG ELECTRONICS CO., LTD., Suwon-si (KR)

(72) Inventors: Chang Soon Park, Suwon-si (KR); Young Jun Hong, Suwon-si (KR); Sujit Jos, Bangalore (IN); Young Soo Kim, Suwon-si (KR); Chandrashekhar Thejaswi PS, Bangalore (IN); Kiran Bynam, Jalahalli (IN); Manoj Choudhary, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/971,825

(22) Filed: May 4, 2018

(65) Prior Publication Data
US 2018/0254929 A1 Sep. 6, 2018

Related U.S. Application Data

(63) Continuation of application No. 15/033,352, filed as application No. PCT/KR2014/010256 on Oct. 29, 2014, now Pat. No. 9,967,114.

(30) Foreign Application Priority Data

Oct. 29, 2013 (IN) .......................... 4875/CHE/2013
Oct. 29, 2014 (KR) ........................ 10-2014-0148299

(51) Int. Cl.
*H04B 1/709* (2011.01)
*H04L 25/03* (2006.01)
(Continued)

(52) U.S. Cl.
CPC ....... *H04L 25/03834* (2013.01); *H04B 1/709* (2013.01); *H04L 25/03312* (2013.01);
(Continued)

(58) Field of Classification Search
USPC .......................... 375/146, 141, 359; 370/474
See application file for complete search history.

(56) References Cited

U.S. PATENT DOCUMENTS 4,096,527 A  6/1978 Furuta
5,363,144 A  11/1994 Park
(Continued)

FOREIGN PATENT DOCUMENTS

CN  102368758 A  3/2012
JP  2004-343705 A  12/2004
(Continued)

OTHER PUBLICATIONS

Communication dated Apr. 5, 2017 issued by European Patent Office in counterpart European Patent Application No. 14856834.8.
(Continued)

*Primary Examiner* — Eva Y Puente
(74) *Attorney, Agent, or Firm* — NSIP Law

(57) ABSTRACT

A method and a transmitter for transmitting a pay load sequence are provided. The transmitter includes a ternary sequence mapper configured to map a binary data sequence to a ternary sequence stored in the transmitter, and a pulse shaping filter configured to generate a first signal based on the mapped ternary sequence. The ternary sequence includes elements of −1, 0, and 1.

18 Claims, 17 Drawing Sheets

(51) Int. Cl.
*H04L 25/49* (2006.01)
*H04L 27/04* (2006.01)
*H04B 1/7163* (2011.01)

(52) U.S. Cl.
CPC .......... *H04L 25/4923* (2013.01); *H04L 27/04* (2013.01); *H04B 1/71637* (2013.01)

(56) References Cited

U.S. PATENT DOCUMENTS

| | | | |
|---|---|---|---|
| 5,533,056 | A | 7/1996 | Cripps |
| 5,867,534 | A | 2/1999 | Price et al. |
| 6,249,321 | B1 | 6/2001 | Bae et al. |
| 6,411,799 | B1 | 6/2002 | Padovani |
| 9,294,316 | B2 * | 3/2016 | Schmidl ............ H04L 25/03866 |
| 2006/0166619 | A1 | 7/2006 | Roberts |
| 2006/0203931 | A1 | 9/2006 | Orlik et al. |
| 2007/0190953 | A1 | 8/2007 | Tan Eng Choon et al. |
| 2008/0247442 | A1 | 10/2008 | Orlik et al. |
| 2009/0316832 | A1 | 12/2009 | Tang |
| 2010/0290780 | A1 * | 11/2010 | Teipen .................. H04B 10/27 398/27 |
| 2010/0318351 | A1 | 12/2010 | Sgraja et al. |
| 2011/0135048 | A1 * | 6/2011 | Mo ..................... H04L 27/2657 375/359 |
| 2011/0281529 | A1 * | 11/2011 | Sahara .................. H04W 28/18 455/73 |
| 2012/0163497 | A1 * | 6/2012 | Kim ..................... H04J 11/0079 375/296 |
| 2013/0259068 | A1 * | 10/2013 | Takagi .................. H04L 12/413 370/474 |
| 2014/0016653 | A1 * | 1/2014 | Oh ..................... H04W 72/0406 370/474 |
| 2016/0191111 | A1 * | 6/2016 | Schmidl ............... H04B 1/7085 375/141 |
| 2016/0261440 | A1 | 9/2016 | Jos et al. |
| 2017/0111203 | A1 * | 4/2017 | Mihota ................... H04L 27/04 |
| 2017/0272118 | A1 * | 9/2017 | Lingam ................ H04B 1/7097 |

FOREIGN PATENT DOCUMENTS

| | | |
|---|---|---|
| JP | 2005-198275 A | 7/2005 |
| JP | 2008-537446 A | 9/2008 |
| JP | 2009-505060 A | 2/2009 |
| JP | 2009-524270 A | 6/2009 |
| JP | 2010-057196 A | 3/2010 |
| JP | 2011-527854 A | 11/2011 |
| KR | 10-2000-0060755 A | 10/2000 |
| KR | 10-2002-0046118 A | 6/2002 |
| KR | 10-2005-0098998 A | 10/2005 |
| KR | 10-2005-0115236 A | 12/2005 |
| KR | 10-2009-0060911 A | 6/2009 |

OTHER PUBLICATIONS

Jian Xing Lee, et al., "UWB Piconet Interference Suppression Using Clustered Ternary Orthogonal Signaling Scheme", The 2009 IEEE International Conference on Ultra-Wideband, pp. 82-87, Sep. 11, 2009.

Ayse Adalan, et al., "Ultra-Wideband Radio Pulse Shaping Filter Design for IEEE 802.15.4a Transmitter", IEEE 2009 Wireless Communications and Networking Conference, total 7 pages, Apr. 8, 2009.

Zhongding Lei, et al., "UWB Ranging with Energy Detectors using Ternary Preamble Sequences", 2006 IEEE Wireless Communications and Networking Conference, vol. 2, pp. 872-877, Apr. 6, 2006.

International Search Report for PCT/KR2014/010256 dated Jan. 27, 2015 [PCT/ISA/210].

Written Opinion for PCT/KR2014/010256 dated Jan. 27, 2015 [PCT/ISA/237].

Xiaoming Peng, et al., "A Rake Combining Scheme for an Energy Detection Based Noncoherent OOK Receiver in UWB Impulse Radio Systems," 2006 IEEE International Conference on Ultra-Wideband, U.S., IEEE, Sep. in 2006, p. 73-78.

Chinese Office Action dated Dec. 5, 2018 in counterpart Chinese Patent Application No. 201480071636.3 (14 pages in Chinese, 18 pages in English).

Japanese Office Action dated Dec. 18, 2018 in counterpart Japanese Patent Application No. 2016-527351 (4 pages in Japanese, 2 pages in English).

* cited by examiner

200

METHOD AND DEVICE FOR TRANSMITTING PAY LOAD SEQUENCE

CROSS-REFERENCE TO RELATED APPLICATIONS

This application is a continuation of U.S. patent application Ser. No. 15/033,352, filed on Nov. 16, 2016 in the U.S. Patent and Trademark Office, which is a U.S. national stage application under 35 USC 371 of International Application No. PCT/KR2014/010256, filed on Oct. 29, 2014 in the Korean Intellectual Property Office, which claims priority from Indian Patent Application No. 4875/CHE/2013, filed on Oct. 29, 2013 in the Indian Patent Office, and Korean Patent Application No. 10-2014-0148299, filed on Oct. 29, 2014 in the Korean Intellectual Property Office, the disclosures of which are incorporated herein by reference in their entireties.

BACKGROUND

1. Field

Apparatuses and methods consistent with exemplary embodiments relate to transmitting a payload sequence.

2. Description of Related Art

In general, modulation schemes of a digital wireless communication system may be classified into a non-coherent modulation scheme and a coherent modulation scheme. The non-coherent modulation scheme may be suitable for a non-coherent receiver having low power consumption and low complexity. The coherent modulation scheme may be suitable for a coherent receiver having relatively less constraints on power consumption and complexity compared to the non-coherent modulation scheme. The coherent modulation scheme may have an excellent performance.

SUMMARY

According to an aspect of an exemplary embodiment, there is provided a transmitter including: a ternary sequence mapper configured to receive a binary data sequence and map the received binary data sequence to a ternary sequence stored in the transmitter, and a pulse shaping filter configured to generate a first signal based on the mapped ternary sequence and adjust a frequency band of a first signal.

The ternary sequence mapper may be configured to divide the binary data sequence including elements of 0 and 1 based on a predetermined length, and map the divided binary data sequence to the ternary sequence.

The transmitter may further include a first signal converter comprising the ternary sequence mapper and the pulse shaping filter, and a second signal converter configured to convert the first signal to a second signal by converting each section of the first signal based on the ternary sequence elements.

The second signal converter may include a zero-value converter configured to convert a section corresponding to the element of 0 in the first signal; and an absolute value one converter configured to convert a section corresponding to the element of 1 and a section corresponding to the element of −1 in the first signal.

The zero-value converter may include a zero-value detector configured to detect the section corresponding to the element of 0 in the first signal.

The zero-value converter may include an ON-OFF controller configured to turn off an output of the section corresponding to the element of 0.

The absolute value one converter may include an absolute value detector configured to detect a section corresponding to an absolute value one in the first signal; and a sign detector configured to detect a sign of the element of the absolute value one, and to classify the section corresponding to the element of the absolute value one into the section corresponding to the element of 1 and the section corresponding to the element of −1.

The absolute value one converter may include a frequency shifter configured to shift a frequency of the section corresponding to the element of 1 to a first frequency, and to shift a frequency of the section corresponding to the element of −1 to a second frequency, in the first signal.

The absolute value one converter may include a phase shifter configured to shift a phase of the section corresponding to the element of 1 to a first phase, and to shift a phase of the section corresponding to the element of −1 to a second phase, in the first signal.

The absolute value one converter may include a frequency shifter configured to shift a frequency of the section corresponding to the element of 1 to a first frequency and to shift a frequency of the section corresponding to the element of −1 to a second frequency, in the first signal; and a phase shifter configured to shift a phase of the section corresponding to the element of 1 and to shift a phase of the section corresponding to the element of −1 to a second phase, in the first signal.

The second signal converter may include an amplifier configured to amplify an amplitude of the second signal.

The ternary sequence mapper may be configured to extract, from the following Table 1, a ternary sequence corresponding to the binary data sequence, and in the following Table 1, $C_0$ denotes a sequence of [0 0 0 1 −1 0 1 1], $C_m$ denotes a sequence acquired by cyclically shifting $C_0$ to a right side by m, and m denotes an integer between 1 and 7.

TABLE 1

| Binary data sequence 3-tuple | Data symbol $m \in \mathcal{A}$ | Ternary sequence $c_m \in \mathbf{C}$ |
|---|---|---|
| 000 | 0 | $c_0$ |
| 100 | 1 | $c_1$ |
| 110 | 2 | $c_2$ |
| 010 | 3 | $c_3$ |
| 011 | 4 | $c_4$ |
| 111 | 5 | $c_5$ |
| 101 | 6 | $c_6$ |
| 001 | 7 | $c_7$ |

The ternary sequence mapper may be configured to extract, from the following Table 2, a ternary sequence corresponding to the binary data sequence, and in the following Table 2, $C_0$ denotes a sequence of [−1 0 0 1 0 1 −1 0 −1 −1 1 −1 0 1 0 1 0 0 0 1 0 0 1 1 −1 0 0 0 0 0 1 1], $C_m$ denotes a sequence acquired by cyclically shifting $C_0$ to a right side by m where m denotes an integer between 1 and 31.

TABLE 2

| Binary data sequence 5-tuple | Data symbol $m \in \mathcal{A}$ | Ternary sequence $c_m \in \mathbf{C}$ |
|---|---|---|
| 00000 | 0 | $c_0$ |
| 10000 | 1 | $c_1$ |

TABLE 2-continued

| Binary data sequence 5-tuple | Data symbol $m \in \mathcal{A}$ | Ternary sequence $c_m \in \mathbf{C}$ |
|---|---|---|
| 11000 | 2 | $c_2$ |
| 01000 | 3 | $c_3$ |
| 01100 | 4 | $c_4$ |
| 11100 | 5 | $c_5$ |
| 10100 | 6 | $c_6$ |
| 00100 | 7 | $c_7$ |
| 00110 | 8 | $c_8$ |
| 10110 | 9 | $c_9$ |
| 11110 | 10 | $c_{10}$ |
| 01110 | 11 | $c_{11}$ |
| 01010 | 12 | $c_{12}$ |
| 11010 | 13 | $c_{13}$ |
| 10010 | 14 | $c_{14}$ |
| 00010 | 15 | $c_{15}$ |
| 00011 | 16 | $c_{16}$ |
| 10011 | 17 | $c_{17}$ |
| 11011 | 18 | $c_{18}$ |
| 01011 | 19 | $c_{19}$ |
| 01111 | 20 | $c_{20}$ |
| 11111 | 21 | $c_{21}$ |
| 10111 | 22 | $c_{22}$ |
| 00111 | 23 | $c_{23}$ |
| 00101 | 24 | $c_{24}$ |
| 10101 | 25 | $c_{25}$ |
| 11101 | 26 | $c_{26}$ |
| 01101 | 27 | $c_{27}$ |
| 01001 | 28 | $c_{28}$ |
| 11001 | 29 | $c_{29}$ |
| 10001 | 30 | $c_{30}$ |
| 00001 | 31 | $c_{31}$ |

According to an aspect of another exemplary embodiment, there is provided a transmitter including a ternary sequence mapper configured to map a binary data sequence to a ternary sequence of a plurality of ternary sequences stored in the transmitter, each of the plurality of ternary sequences including elements of −1, 0, and 1; and a converter configured to convert the ternary sequence to a signal, wherein the ternary sequence mapper is configured to extract, from the following Table 3, the ternary sequence corresponding to the binary data sequence, and in the following Table, 3, $C_0$ denotes a sequence of [0 0 0 1 −1 0 1 1], $C_m$ denotes a sequence acquired by cyclically shifting $C_0$ to right by m, and m denotes an integer between 1 and 7.

TABLE 3

| Binary data sequence 3-tuple | Data symbol $m \in \mathcal{A}$ | Ternary sequence $c_m \in \mathbf{C}$ |
|---|---|---|
| 000 | 0 | $c_0$ |
| 100 | 1 | $c_1$ |
| 110 | 2 | $c_2$ |
| 010 | 3 | $c_3$ |
| 011 | 4 | $c_4$ |
| 111 | 5 | $c_5$ |
| 101 | 6 | $c_6$ |
| 001 | 7 | $c_7$ |

According to an aspect of another exemplary embodiment, there is provided a transmitter including: a ternary sequence mapper configured to map a binary data sequence to a ternary sequence of a plurality of ternary sequences stored in the transmitter, each of the plurality of ternary sequences including elements of −1, 0, and 1; and a converter configured to convert the ternary sequence to a signal, wherein the ternary sequence mapper is configured to extract, from the following Table 4, a ternary sequence corresponding to the binary data sequence, and in the following Table 4, $C_0$ denotes a sequence of [−1 0 0 1 0 1 −1 0 −1 −1 1 −1 0 1 0 1 0 0 0 1 0 0 1 1 −1 0 0 0 0 1 1], $C_m$, denotes a sequence acquired by cyclically shifting $C_0$ to a right side by m, and m denotes an integer between 1 and 31.

TABLE 4

| Binary data sequence 5-tuple | Data symbol $m \in \mathcal{A}$ | Ternary sequence $c_m \in \mathbf{C}$ |
|---|---|---|
| 00000 | 0 | $c_0$ |
| 10000 | 1 | $c_1$ |
| 11000 | 2 | $c_2$ |
| 01000 | 3 | $c_3$ |
| 01100 | 4 | $c_4$ |
| 11100 | 5 | $c_5$ |
| 10100 | 6 | $c_6$ |
| 00100 | 7 | $c_7$ |
| 00110 | 8 | $c_8$ |
| 10110 | 9 | $c_9$ |
| 11110 | 10 | $c_{10}$ |
| 01110 | 11 | $c_{11}$ |
| 01010 | 12 | $c_{12}$ |
| 11010 | 13 | $c_{13}$ |
| 10010 | 14 | $c_{14}$ |
| 00010 | 15 | $c_{15}$ |
| 00011 | 16 | $c_{16}$ |
| 10011 | 17 | $c_{17}$ |
| 11011 | 18 | $c_{18}$ |
| 01011 | 19 | $c_{19}$ |
| 01111 | 20 | $c_{20}$ |
| 11111 | 21 | $c_{21}$ |
| 10111 | 22 | $c_{22}$ |
| 00111 | 23 | $c_{23}$ |
| 00101 | 24 | $c_{24}$ |
| 10101 | 25 | $c_{25}$ |
| 11101 | 26 | $c_{26}$ |
| 01101 | 27 | $c_{27}$ |
| 01001 | 28 | $c_{28}$ |
| 11001 | 29 | $c_{29}$ |
| 10001 | 30 | $c_{30}$ |
| 00001 | 31 | $c_{31}$ |

According to an aspect of another exemplary embodiment, there is provided a receiver including: an envelope detector configured to detect an amplitude value of an envelope of a received signal that is converted from a ternary sequence including elements of −1, 0, and 1; and a binary data sequence detector configured to detect a binary data sequence corresponding to the ternary sequence based on a correlation between the detected amplitude value of the envelope and a plurality of predetermined binary sequences.

The receiver may further include a filter configured to filter the received signal based on a first frequency. The envelope detector may be configured to detect the envelope of the filtered received signal.

The first frequency may be a frequency between a second frequency and a third frequency, the second frequency may be a frequency of a section of the received signal converted from the element of 1 in the ternary sequence and the third frequency may be a frequency of a section of the received signal converted from the element of −1 in the ternary sequence.

The binary data sequence detector may be configured to determine, as the binary data sequence, a bit sequence having a highest correlation with the detected amplitude value of the envelope among the plurality of predetermined binary sequences.

A receiver according to an example embodiment includes an entire envelope detector configured to detect an amplitude value of an envelope of a received signal converted from a ternary sequence including elements of −1, 0, and 1; and a binary data sequence detector configured to detect a binary data sequence corresponding to the ternary sequence based on a correlation between the detected amplitude value of the envelope and a plurality of predetermined ternary sequences.

The entire envelope detector may include a first filter configured to filter the received signal based on a first frequency; a second filter configured to filter the received signal based on a second frequency; a first envelope detector configured to detect a first envelope of the received signal that is filtered based on the first frequency; a second envelope detector configured to detect a second envelope that indicates an envelope of the received signal filtered using the second frequency; and a calculator configured to extract a third envelope based on a difference between the first envelope and the second envelope.

The binary data sequence detector may be configured to detect, as the binary data sequence, a bit sequence corresponding to a ternary sequence having a highest correlation with the third envelope among the plurality of predetermined ternary sequences.

According to an aspect of another exemplary embodiment, there is provided a receiver including: a correlation detector configured to detect a correlation between a reference signal and a received signal converted from a ternary sequence including elements of −1, 0, and 1; and a binary data sequence detector configured to detect a binary data sequence corresponding to the ternary sequence based on a correlation between a result value of the correlation and a plurality of predetermined ternary sequences.

The binary data sequence detector may be configured to determine, as the binary data sequence, a bit sequence corresponding to a ternary sequence having a highest correlation with the result value of the correlation among the plurality of predetermined ternary sequences.

According to an aspect of another exemplary embodiment, there is provided a receiver including: a signal receiver configured to receive a signal modulated from a ternary sequence that converted from a binary data sequence by mapping the binary data sequence to the ternary sequence, the ternary sequence including elements of −1, 0, and 1; and a detector configured to detect the ternary sequence and the binary data sequence by referring to the following Table 5. In the following Table 5, $C_0$ denotes a sequence of [0 0 0 1 −1 0 1 1], $C_m$ denotes a sequence acquired by cyclically shifting $C_0$ to a right side by m, and m denotes an integer between 1 and 7.

TABLE 5

| Binary data sequence 3-tuple | Data symbol $m \in \mathcal{A}$ | Ternary sequence $c_m \in \mathbf{C}$ |
|---|---|---|
| 000 | 0 | $c_0$ |
| 100 | 1 | $c_1$ |
| 110 | 2 | $c_2$ |
| 010 | 3 | $c_3$ |
| 011 | 4 | $c_4$ |
| 111 | 5 | $c_5$ |
| 101 | 6 | $c_6$ |
| 001 | 7 | $c_7$ |

According to an aspect of another exemplary embodiment, there is provided a receiver including: a signal receiver configured to receive a signal modulated from a ternary sequence that converted from a binary data sequence by mapping the binary data sequence to the ternary sequence, the ternary sequence including elements of −1, 0, and 1; and a detector configured to detect the ternary sequence and the binary data sequence by referring to the following Table 6. In the following Table 6, $C_0$ denotes a sequence of [−1 0 0 1 0 1 −1 0 −1 −1 1 −1 0 1 0 1 0 0 0 1 0 0 1 1 −1 0 0 0 0 0 1 1], $C_m$ denotes a sequence acquired by cyclically shifting $C_0$ to a right side by m, and m denotes an integer between 1 and 31,

TABLE 6

| Binary data sequence 5-tuple | Data symbol $m \in \mathcal{A}$ | Ternary sequence $c_m \in \mathbf{C}$ |
|---|---|---|
| 00000 | 0 | $c_0$ |
| 10000 | 1 | $c_1$ |
| 11000 | 2 | $c_2$ |
| 01000 | 3 | $c_3$ |
| 01100 | 4 | $c_4$ |
| 11100 | 5 | $c_5$ |
| 10100 | 6 | $c_6$ |
| 00100 | 7 | $c_7$ |
| 00110 | 8 | $c_8$ |
| 10110 | 9 | $c_9$ |
| 11110 | 10 | $c_{10}$ |
| 01110 | 11 | $c_{11}$ |
| 01010 | 12 | $c_{12}$ |
| 11010 | 13 | $c_{13}$ |
| 10010 | 14 | $c_{14}$ |
| 00010 | 15 | $c_{15}$ |
| 00011 | 16 | $c_{16}$ |
| 10011 | 17 | $c_{17}$ |
| 11011 | 18 | $c_{18}$ |
| 01011 | 19 | $c_{19}$ |
| 01111 | 20 | $c_{20}$ |
| 11111 | 21 | $c_{21}$ |
| 10111 | 22 | $c_{22}$ |
| 00111 | 23 | $c_{23}$ |
| 00101 | 24 | $c_{24}$ |
| 10101 | 25 | $c_{25}$ |
| 11101 | 26 | $c_{26}$ |
| 01101 | 27 | $c_{27}$ |
| 01001 | 28 | $c_{28}$ |
| 11001 | 29 | $c_{29}$ |
| 10001 | 30 | $c_{30}$ |
| 00001 | 31 | $c_{31}$ |

According to an aspect of another exemplary embodiment, there is provided a transmitter including: a memory configured to store a mapping table comprising a plurality of binary data sequences mapped to a plurality of ternary sequences; a ternary sequence mapper configured to receive an input binary data sequence and map the input binary data sequence to a ternary sequence among the plurality of ternary sequences, the ternary sequence comprising elements of −1, 0, and 1; and a filter configured to convert values of the elements of the ternary sequence to amplitudes of a signal.

The filter may be further configured to convert the element of −1 of the ternary sequence, the element of 0 of the ternary sequence, element of 1 of the ternary sequence to a positive amplitude of the signal, a zero amplitude of the signal, and a negative value of the signal, respectively.

The signal may include a first section corresponding to the element of −1, a second section corresponding to the element of 0, a third section corresponding to the element of 1. The transmitter may further include an amplifier configured to adjust a frequency of the first section of the signal and a frequency of the third section of the signal to be different from each other. Further, the transmitter may further include an amplifier configured to adjust a phase of the first section of the signal and a phase of the third section of the signal to be different from each other.

BRIEF DESCRIPTION OF DRAWINGS

The above and/or other aspects will be more apparent by describing exemplary embodiments, with reference to the accompanying drawings, in which.

DETAILED DESCRIPTION

Figure 1:
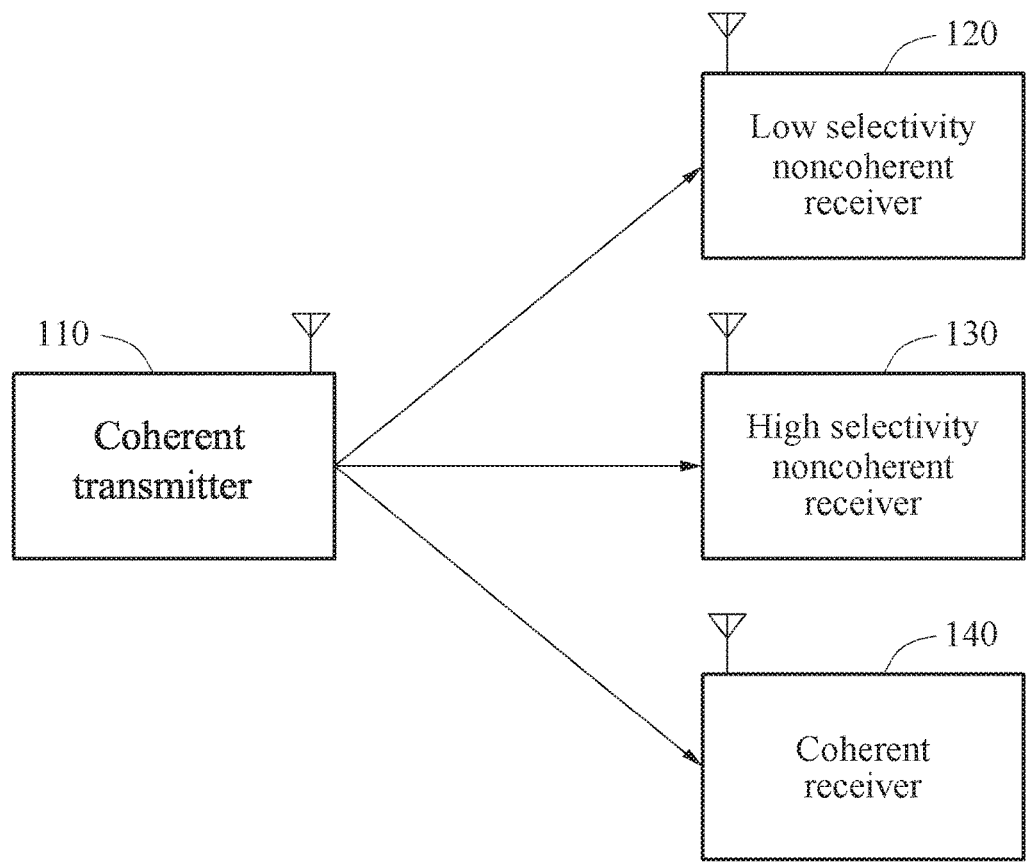
FIG. 1 is a diagram illustrating a wireless communication system according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

The terminology used herein is for the purpose of describing particular exemplary embodiments and is not to be used to limit the exemplary embodiments. As used herein, the terms "a,", "an,", and "the" are identical to include the plural forms as well, unless the context clearly indicates otherwise. As used herein, the terms "include," "comprise,", and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which these exemplary embodiments pertain. Terms, such as those defined in commonly used dictionaries, are to be interpreted as having a meaning that is consistent with their meaning in the context of the relevant art, and are not to be interpreted in an idealized or overlay formal sense unless expressly so defined herein.

Also, when describing with reference to the accompanying drawings, like reference numerals are assigned to like constituent elements and a repeated description related thereto is omitted. When it is determined that a detailed description related to a relevant known art may make the purpose of the exemplary embodiments unnecessarily ambiguous, the detailed description will be omitted here.

FIG. 1 is a diagram illustrating a wireless communication system according to an exemplary embodiment.

Referring to FIG. 1, the wireless communication system may include a coherent transmitter 110, noncoherent receivers 120 and 130, and a coherent receiver 140. The noncoherent receiver may be classified into a low selectivity noncoherent receiver 120 and a high selectivity noncoherent receiver 130.

The coherent transmitter 110 may transmit data based on a packet unit. A packet unit may include payload or Physical Service Data Unit (PSDU) that is generated by the coherent transmitter 110 and received by the receivers 120, 130, and 140. The payload may include data and a Cyclical Redundancy Check (CRC) that the coherent transmitter 110 is to transmit.

The coherent transmitter 110 may modulate the payload using a coherent modulation scheme. When a binary bit sequence is to be transmitted to the receivers 120, 130, and 140 using the coherent modulation scheme, the coherent transmitter 110 may map different bit sequences with a constant length to different code sequences and may transmit the mapped code sequences. Here, a length of a code sequence may be greater than a length of a bit sequence, or a number of elements or letters of the code sequence may be greater than a number of elements or letters of the bit sequence. Also, the code sequence may include elements $\{-1, 0, +1\}$. According to an exemplary embodiment, a sequence including elements $\{-1, 0, +1\}$ may be represented as a ternary sequence, a sequence including elements $\{0, +1\}$ may be represented as a unipolar sequence, and a sequence including elements $\{-1, 1\}$ may be represented as a bipolar sequence. Here, if a frequency of a carrier signal corresponding to the element +1 and a frequency of a carrier signal corresponding to the element −1 differ from each other, the element +1 may indicate setting a phase value of the carrier signal as zero degree, the element 0 may indicate setting the carrier signal to be turned off, and the element −1 may indicate setting the phase value of the carrier signal to be 180 degrees. Hereinafter, the term "phase" may be represented as an angular frequency. When the low selectivity noncoherent receiver 120 receives a packet from the coherent transmitter 110, the low selectivity noncoherent receiver 120 may demodulate the payload based on a noncoherent demodulation scheme and thus, may not distinguish different phases of carrier signals. Since the low selectivity noncoherent receiver 120 may not distinguish the element +1 from the element −1 and vice versa, the low selectivity noncoherent receiver 120 may recognize a ternary sequence as a unipolar sequence. The high selectivity noncoherent receiver 130 may distinguish different frequencies of carrier signals using a filter having a relatively high frequency selectivity or a relatively high Q-factor filter. Thus, the high selectivity noncoherent receiver 130 may distinguish elements +1 and −1 of a ternary sequence and may recognize the ternary sequence.

When the coherent receiver 140 receives a packet from the coherent transmitter 110, the coherent receiver 140 may demodulate a payload of the packet using a coherent demodulation scheme. Based on the coherent modulation scheme, the coherent receiver 140 may distinguish different phases of received signals that carry the packet and may recognize a ternary sequence of the received signals.

Hereinafter, a method of generating a ternary sequence applicable to the noncoherent receivers 120 and 130 and the coherent receiver 140 will be described.

Also, a method of transmitting and receiving a payload using the generated ternary sequence will be described with reference to FIGS. 2 through 15.

<Design of Ternary Sequence>

*System for Generating Ternary Sequence*

The system for generating ternary sequence may include a coherent transmitter 110, a coherent receiver 140, and a noncoherent receiver 120 or 130. The system may use the following elements:

a) Unipolar binary element {0, 1}
b) Ternary element {0, ±1}

A sequence/codeword including a ternary element may be represented as a ternary sequence/codeword. A sequence/codeword including a unipolar binary element may be represented as a unipolar binary sequence/codeword.

According to an exemplary embodiment, the coherent transmitter 110 may extract a symbol from an M-ary element S. Here, S may denote S={0, 1 . . . , $2^k-1$}, k=$\log_2$(M). Accordingly, an information rate may be k-bits/symbol. Before the coherent transmitter 110 performs transmission, each symbol extracted from the M-ary element S may be mapped to one of M number of waveforms or codewords derived from a spreading code C. Here, the term "spreading code" may also indicate a spreading factor or coefficient. That is, mapping of a symbol may be represented as m∈S⇒$c_m$∈C={$c_0$, . . . , $C_{M-1}$}. If N denotes a length of a codeword, an effective rate of a code or a spreading code may be represented as $$r = \frac{k}{N}.$$

According to an exemplary embodiment, a transmitted waveform corresponding to symbol m∈S, equivalently, $c_m$∈C may be represented as Equation 1.

$$C_m(t) = \sum_{n=0}^{N-1} C_m[n]g(t - nT_c) \quad \text{[Equation 1]}$$

In Equation 1, g(t) denotes a chip waveform, $T_c$ denotes a chip duration.

Under the assumption of a constant weight code or equal energy waveforms, a symbol detected at the receiver through matched filtering or correlation may be represented as Equation 2. In Equation 2, T denotes a symbol duration and may be represented as T=N×Tc.

$$\hat{m} = \underset{m \in \{0,1,...M\}}{\operatorname{argmax}} C_m; \text{ where } C_m = \int_0^T y(t)c_m(t)dt \quad \text{[Equation 2]}$$

In Equation 2, y(t) denotes a received waveform. y(t) may be deformed by additive white Gaussian noise (AWGN). m̂ may be defined as a symbol estimated at the receiver.

A symbol detection at the receiver may be carried out by performing correlation using a bank of M correlators that match M waveforms, respectively.

*Condition for Generating Code*

When a ternary sequence/codeword is transmitted, the coherent receiver 140 may recognize polarities of chips and may recognize the ternary sequence/codeword. On the contrary, the noncoherent receiver 120 or 130 (e.g., a receiver operating based on energy detection) may recognize the ternary sequence/codeword as a unipolar binary sequence/codeword due to lack of phase information.

According to an exemplary embodiment, a spreading code may satisfy the followings requirements:

1) Sequences of a ternary code set C are maximally separated.
2) Sequences corresponding to a binary set |C| are maximally separated

*Generating Spreading Code for Ultra Low Power (ULP)*

Due to differences of generating methods between a coherent spreading code and a noncoherent spreading code, the spreading code generating method for ULP may show aspects different from the aforementioned description. Hereinafter, an efficient method of generating spreading code will be described.

*Basic Definition and Concept*

Spreading codes for ULP may be acquired using two-level autocorrelation sequences. The two-level autocorrelation sequences may be used as a basis to acquire a coherent ternary code and a noncoherent binary code or an optical orthogonal code (OOC).

*Ternary Sequence having Perfect Periodic Autocorrelation*

A ternary sequence having perfect periodic autocorrelation and a length of N may have autocorrelation as expressed by Equation 3:

$$\hat{R}_{x,x}(k) = \begin{cases} N & \text{if } k = 0 \\ 0 & \text{if } k \neq 0 \mod N \end{cases} \quad \text{[Equation 3]}$$

*Two-level Autocorrelation Sequence*

A binary sequence may be represented as {$x_1$, $x_2$, . . . , $x_N$}, where $x_i$∈{0,1} and i is an integer from 1 to N. If the following condition of Equation 4 is met, the binary sequence may have two-level autocorrelation:

$$\hat{R}_{x,x}(k) = \begin{cases} N & \text{if } k = 0 \\ A & \text{if } k \neq 0 \mod N \end{cases} \quad \text{[Equation 4]}$$

In Equation 4, an autocorrelation function $\hat{R}(k)$ may be defined as $$\hat{R}(k) = \sum_{i=0}^{N-1} (-1)^{x_i \oplus x_{(i+k) \mod N}}.$$

If A=−1, the binary sequence may be an ideal two-level autocorrelation sequence. Such sequences may serve as a bridge between a coherent ternary sequence and a noncoherent binary sequence. Many of the sequences may correspond to an m-sequence having a length of N=$2^m-1$ where m denotes an integer.

*Cyclic Different Set*

A difference set of A(n, k, λ) may be represented as D={$d_1$, $d_2$, . . . , $d_k$}. Here, k denotes an integer. A number of solution pairs $(d_i, d_j)$ of elements of the difference set D may be λ, and a relationship between $d_i$ and $d_j$ may be represented as $d_i - d_j \equiv t \pmod{N}$. Here, t may be represented as $1 \le t \le N-1$.

The cyclic difference set may correspond to two-level autocorrelation sequences in one-to-one manner. Accordingly, the cyclic difference set may be used to generate ternary sequences having the perfect autocorrelation.

*Spreading Code for ULP*

The method for synchronizing the system (e.g., synchronizing the coherent transmitter 110 with the receiver 120, 130, or 140) may include selecting sequences having an excellent autocorrelation attribute and assigning different cyclic shifts to different symbols.

Hereinafter, a method of generating shift equivalent codes of spreading codes 8, 16, and 32 will be described.

1. Select an m-sequence with the period of N−1. Here, N denotes a target spreading code of a ternary code.

2. Acquire the same period of a ternary sequence from the m-sequence by converting at least one element of 1 and by maintaining elements of 0. It may be represented as a procedure A.

3. Add the element 0 or 1 to a sequence in order to prevent damage to correlation of the sequence.

4. The following two cases are possible based on the m-sequence and zero padding:
  i) Balanced ternary sequence obtained from the m-sequence of weight N/2 or (N−2)/2
  ii) Unbalanced ternary sequence obtained from the m-sequence with the same weight, which is either (N−2)/2 or N/2+1

The acquired ternary sequences may be characterized based on excellent correlation attributes. A set of spreading sequences to which different symbols are allocated may be acquired based on cyclic shifts of the acquired ternary sequences. According to an exemplary embodiment, spreading codes 8, 16, and 32 may correspond to symbol sizes 3, 4, and 5, respectively.

*Balanced Sequences Acquired from M-Sequences with Weight of N/2*

The following procedure may refer to a procedure of acquiring the balanced ternary sequence with the weight of N/2 from the m-sequence with the weight of N/2.

1. Select the m-sequence with the weight of N/2.

2. Acquire a ternary sequence with the period of N−1 from the m-sequence with the period of N−1 using the procedure A if N=perfect square.

3. Add the element of 0 to the acquired ternary sequence to minimize Mean Squared AutoCorrelation (MSAC). Here, the MSAC may be defined as Equation 5.

$$\mu_{MSAC} = \frac{1}{(N-1)} \Sigma_{\tau=1}^{N-1} R(\tau)^2 \quad \text{[Equation 5]}$$

In Equation 5, $R(\tau)$ denotes autocorrelation normalized at the period of a sequence in delay τ, and may be defined as Equation 6.

$$R(\tau) = 1/w \Sigma_{n=0}^{N-1} c_n c_{n+\tau} \quad \text{[Equation 6]}$$

In Equation 6, w denotes a hamming weight of a sequence. Balanced sequences acquired from a representative m-sequence with the weight of N/2 may be represented as Table 1.

TABLE 1

| Period | Basic Ternary spreading sequence | Base sequence | $\mu_{coherent}$ | $\mu_{non-coherent}$ |
|---|---|---|---|---|
| 8 | 1 1 −1 0 0 1 0 0; 0 1 1 −1 0 0 1 0; 1 0 1 1 −1 0 0 0; 0 1 0 1 1 −1 0 0; 0 0 1 0 1 1 −1 0 | 1 1 −1 0 0 1 0 | 0.0536 | 0.1964 |
| 16 | 1 1 0 0 −1 0 0 0 1 1 −1 1 0 1 0 0; 0 1 1 −1 1 0 1 0 1 1 0 0 −1 0 0 0 | 0 1 1 −1 1 0 1 0 1 1 0 0 −1 0 0 | 0.0250/ 0.0375 | 0.2250/ 0.2208 |
| | 0 1 1 1 1 0 −1 0 1 −1 0 0 1 0 0 0 | 0 1 1 1 1 0 −1 0 1 −1 0 0 1 0 0 | 0.0125 | 0.2208 |
| 32 | 1 1 −1 1 −1 0 0 0 1 1 0 1 −1 −1 0 1 0 −1 0 0 0 0 −1 0 0 1 0 1 1 0 0 0 | −1 0 0 1 0 1 1 0 0 1 1 −1 1 −1 0 0 0 1 1 0 1 −1 −1 0 1 0 −1 0 0 0 0 | 0.0111 | 0.2359 |

According to an exemplary embodiment, other m-sequences may be replaced with base sequences.

*Balanced Sequences Acquired from M-Sequences with Weight of (N−2)/2

The following procedure may refer to a procedure of acquiring the balanced ternary sequence with the weight of N/2 from the m-sequence with the weight of (N−2)/2.

1. Acquire a ternary sequence with the period of N−1 from the m-sequence. A perfect ternary sequence with the weight of (N−2)/2 may be absent. Accordingly, a procedure B may be employed to deduce a ternary sequence having an excellent correlation attribute from a ternary element.

2. Add the element of 1 to the acquired ternary sequence to minimize MSAC.

3. Result sequences may be characterized by the weight of N/2.

Balanced sequences acquired from the representative m-sequence with the weight of (N−2)/2 may be represented as Table 2.

TABLE 2

| Period | Basic Ternary spreading sequence | Base sequence | $\mu_{coherent}$ | $\mu_{non-coherent}$ |
|---|---|---|---|---|
| 8 | 0 0 0 1 −1 0 1 1; 1 0 0 0 1 −1 0 1 | 0 0 0 1 −1 0 1 | 0.0536 | 0.1964 |
| 16 | −1 0 0 0 0 1 0 −1 0 0 1 1 0 1 1 1; 1 −1 0 0 0 1 0 −1 0 0 1 1 0 1 | −1 0 0 0 0 1 0 −1 0 0 1 1 0 1 1 | 0.0125 | 0.2208 |
| 32 | −1 0 0 1 0 1 −1 0 −1 −1 1 −1 0 −1 −1 −1 0 1 0 1 0 0 0 0 1 0 1 0 0 1 1 −1 | 0 −1 −1 1 −1 0 1 0 1 0 0 1 0 0 1 1 −1 0 0 0 0 1 −1 0 0 1 0 1 −1 | 0.0131 | 0.2359 |

According to an exemplary embodiment, other m-sequences may be replaced with base sequences.

*Consolidated List*

To deduce sequences of Table 3, a sequence in which elements of 0 and elements aside from 0 are uniformly distributed may be selected from Table 1 and Table 2.

TABLE 3

| Period | Basic Ternary spreading sequence | Base sequence | $\mu_{coherent}$ | $\mu_{non\text{-}coherent}$ |
|---|---|---|---|---|
| 8 | 0 0 0 1 −1 0 1 1 | 0 0 0 1 −1 0 1 | 0.0536 | 0.1964 |
| 16 | 1 −1 0 0 0 0 1 0 −1 0 0 1 1 0 1 1 | −1 0 0 0 0 1 0 −1 0 0 1 1 0 1 1 | 0.0125 | 0.2208 |
| 32 | −1 0 0 1 0 1 −1 0 −1 −1 1 −1 0 1 0 1 0 0 0 1 0 0 1 1 −1 0 0 0 0 0 1 1 | 0 −1 −1 1 −1 0 1 0 1 0 0 0 1 0 0 1 1 −1 0 0 0 0 0 1 −1 0 0 1 0 1 −1 | 0.0131 | 0.2359 |

Base ternary spreading sequences of Table 3 may be used to encode data symbols for transmission through a wireless channel. Spreading sequences to encode data symbols may be acquired through a cyclic shift of a single base ternary spreading sequence of Table 3. Accordingly, a number of distinct spreading sequences may be equal to a spreading code. Spreading sequences of a spreading code M may be used to encode data symbols with the size of $k=\log_2 M$. For example, a spreading sequence of the spreading code M=8 may be used to encode a data symbol with the size of $k=\log_2 8=3$.

Also, spreading sequences of spreading codes 16 and 32 may be used to encode data symbols with the sizes of 4 and 5, respectively. In Table 3, the basic ternary spreading sequences may be represented as ⅜-on-off keying (OOK), 4/16-OOK, and 5/32-OOK, respectively. Table 4 shows an example in which the basic ternary sequences of Table 3 are classified into ⅜-OOK, 4/16-OOK, and 5/32-OOK.

TABLE 4

| k | M | Nomenclature | Basic Ternary spreading sequence |
|---|---|---|---|
| 3 | 8 | 3/8-OOK | 0 0 0 1 −1 0 1 1 |
| 4 | 16 | 4/16-OOK | 1 −1 0 0 0 0 1 0 −1 0 0 1 1 0 1 1 |
| 5 | 32 | 5/32-OOK | −1 0 0 1 0 1 −1 0 −1 −1 1 −1 0 1 0 1 0 0 0 1 0 0 1 1 −1 0 0 0 0 0 1 1 |

According to an exemplary embodiment, data symbols may be allocated to spreading codes based on a customized logic, for example, grey coding. Table 5 shows a representative example in which data symbols corresponding to k=3 and M=8 are allocated to spreading codes. Here, a cyclic shift of an original sequence may be a decimal equivalent of a binary data symbol.

TABLE 5

| Data-symbol | Cyclic shift (Decimal equivalent) | Spreading sequence |
|---|---|---|
| 000 | 0 | 0 0 0 1 −1 0 1 1 |
| 001 | 1 | 1 0 0 0 1 −1 0 1 |
| 010 | 2 | 1 1 0 0 0 1 −1 0 |
| 011 | 3 | 0 1 1 0 0 0 1 −1 |
| 100 | 4 | −1 0 1 1 0 0 0 1 |
| 101 | 5 | 1 −1 0 1 1 0 0 0 |
| 110 | 6 | 0 1 −1 0 1 1 0 0 |
| 111 | 7 | 0 0 1 −1 0 1 1 0 |

*Maximum Length Shift Register Sequence (M-Sequence)*

An m-sequence or a maximum length sequence may belong to a general grade of a two-level autocorrelation sequence and may be present for all of $N=2^m-1$ where m denotes an integer. The m-sequence may be generated using a linear feedback shifter register (LFSR) having a primitive polynomial feedback. Such sequence may correspond to a maximum period acquired from a given length LFSR.

*Advantages of Using M-Sequence for Generating Sequence*

Using the m-sequence to design spreading sequences may be advantageous for all of coherent and noncoherent.

In view of the noncoherent, using the m-sequence may have the following advantages:

1) The m-sequence may correspond to a cyclic difference set in a form of $\{2^m-1, 2^{m-1}, 2^{m-2}\}$.

2) It may indicate a constant in phase autocorrelation of $(N+1)/4$ of a unipolar binary element $\{0, 1\}$.

In view of the coherent, using the m-sequence may have the following advantages:

1) If the m-sequence is a perfect square, a perfect sequence of elements $\{0, -1, 1\}$ may be generated from the m-sequence to maintain the element of 0 (e.g., through the procedure A that will be described below).

2) Perfect sequences with the periods of 7 and 31 may be acquired.

3) Such sequence may be expanded based on zero padding and a correlation attribute may not be damaged. The result thereof may be represented as sequences with the periods of 8 and 32. A ternary sequence close to perfection may be acquired for a spreading code 15 through the procedure B by the aforementioned method.

*Procedure A: Acquires Perfect Ternary Sequence from M-Sequence*

If x and y are two ideal two-level autocorrelation sequences, a sequence $\{\theta(x,y)+1\}$ may be a perfect sequence including an element of 0 in phase autocorrelation. Here, $\theta(x,y)$ denotes a cross-correlation sequence between sequences x and y. If two sequences are selected as a preferred pair among m-sequences, a result thereof, that is, $\{\theta(x,y)+1\}$ may be ternary. For example, if preferred pair corresponds to $$\theta(x, y) \in \left\{-1, -1 + 2^{\frac{n+1}{2}}, -1 - 2^{\frac{n+1}{2}}\right\},$$

it may be represented as $$\theta(x, y) + 1 \in \left\{0, \pm 2^{\frac{n+1}{2}}\right\}.$$

A result acquired by dividing $$\{\theta(x, y) + 1\} \text{ by } 2^{\frac{n+1}{2}}$$

may be represented as a sequence including elements $\{0, \pm 1\}$.

*Procedure B: Acquires Ternary Sequence Close to Perfection from M-Sequence*

A perfect ternary sequence may be present if a weight of a sequence is a perfect square. Accordingly, a perfect ternary sequence having a period of 15 may be absent. In this case, a ratio between elements of −1 and elements of +1 in the perfect ternary sequence may be a value between ⅓ and ⅔. Accordingly, the ternary sequence close to perfection may be acquired based on the ratio. A sequence having a smallest MSAC value may be selected. The MSAC may be defined as Equation 7.

$$\mu_{MSAC} = \frac{1}{(N-1)} \Sigma_{\tau=1}^{N-1} R(\tau)^2 \qquad \text{[Equation 7]}$$

In Equation 7, $R(\tau)$ denotes periodic autocorrelation of a sequence in delay $\tau$.

<Transmission and Reception of Ternary Sequence (Ternary Payload Sequence)>

Figure 2:
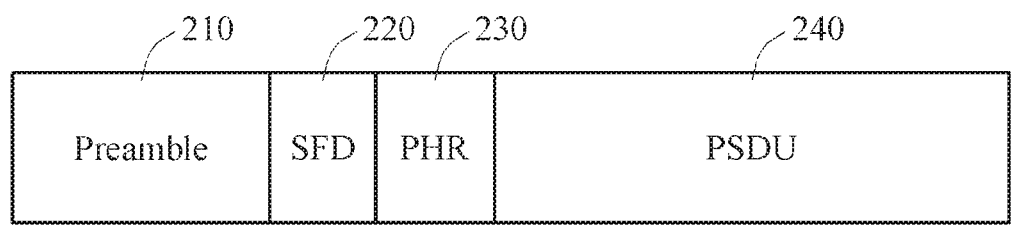
FIG. 2 illustrates a format of a transmission frame according to an exemplary embodiment.

FIG. 2 illustrates a format of a transmission frame according to an exemplary embodiment.

Referring to FIG. 2, a transmission frame 200 may include a preamble 210, a start frame delimiter (SFD) 220, a physical layer header (PHR) 230, and a physical service data unit (PSDU) 240. In one exemplary embodiment, a packet may be used as the same meaning as the transmission frame 200.

The preamble 210 may be a bitstream recorded at the head of the transmission frame 200. The preamble 210 may include a specific bit-pattern for time synchronization.

The SFD 220 may identify a beginning of a frame, and may identify reconfirmation of synchronization. Also, the SFD 220 may indicate a field for acquiring frame synchronization.

The PHR 230 may be a field that includes information associated with a physical layer. For example, information may be information about a length indicator, a used modulation scheme, and a used encoding scheme. Also, the PHR 230 may include a header check sequence (HCS) and a field indicating a format of the PSDU 240. Here, the HCS may be used to determine whether an error has occurred in the PHR 230.

The PSDU 240 may be a unit of data transferred from an upper layer of the physical layer and not encoded in a format of bits. The PSDU 240 may include data that is substantially transmitted and received in the upper layer of the physical layer. The PSDU 240 may be expressed as a payload.

Figure 3:
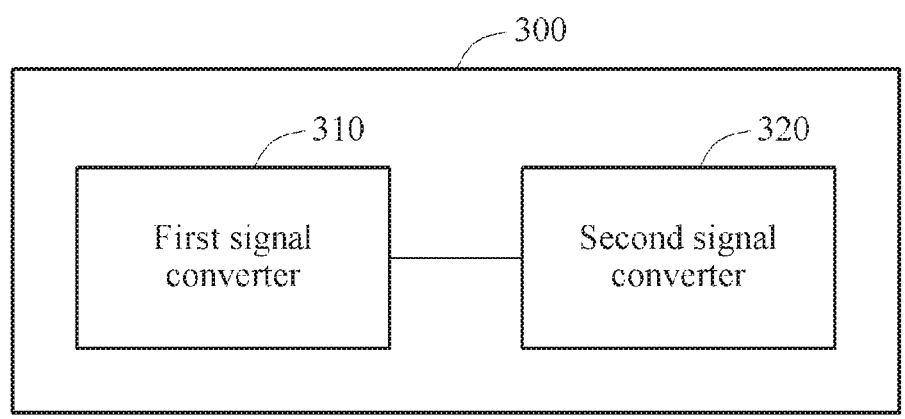
FIG. 3 is a block diagram illustrating a transmitter according to an exemplary embodiment.

FIG. 3 is a block diagram illustrating a transmitter according to an exemplary embodiment.

Referring to FIG. 3, a transmitter 300 may include a first signal converter 310 and a second signal converter 320. Here, the transmitter 300 may correspond to the coherent transmitter 110 of FIG. 1. Hereinafter, a scheme in which a transmitter converts a binary data sequence to a first signal and a second signal may also be referred to as a ternary amplitude shift keying (TASK) scheme, a ternary frequency shift keying (TFSK) scheme, or an ON-OFF FSK scheme.

The first signal converter 310 may convert a ternary sequence including elements of −1, 0, or 1 to the first signal. In one exemplary embodiment, elements may be represented using letters of an alphabet or a chip.

The first signal converter 310 may include a ternary sequence mapper and a converter. The ternary sequence mapper may generate a ternary sequence by mapping a pre-generated ternary sequence to a binary data sequence. In one exemplary embodiment, the ternary sequence mapper may generate a ternary sequence by dividing a binary data sequence including elements of 0 or 1 based on a predetermined length, and by mapping a pre-generated ternary sequence to the divided binary data sequence. Here, the pre-generated ternary sequence may indicate a ternary sequence extracted during the aforementioned ternary sequence design process. Also, the pre-generated ternary sequence may be pre-stored in the transmitter 300. For example, the pre-generated ternary sequence may be stored in a lookup table.

According to an exemplary embodiment, in the case of using a ⅜ TASK modulation scheme, a ternary sequence mapped to a binary data sequence may be shown as in Table 6.

TABLE 6

| Binary data sequence 3-tuple | Data symbol $m \in \mathcal{A}$ | Ternary sequence $c_m \in \mathcal{C}$ |
|---|---|---|
| 000 | 0 | $c_0$ |
| 100 | 1 | $c_1$ |
| 110 | 2 | $c_2$ |
| 010 | 3 | $c_3$ |
| 011 | 4 | $c_4$ |
| 111 | 5 | $c_5$ |
| 101 | 6 | $c_6$ |
| 001 | 7 | $c_7$ |

In Table 6, $C_0$ denotes a sequence of [0 0 0 1 −1 0 1 1] and $C_m$ denotes a sequence acquired by cyclically shifting $C_0$ to the right by m. Here, m denotes an integer between 1 and 7. For example, $C_1$ may denote a sequence of [1 0 0 0 1 −1 0 1] and $C_2$ may denote a sequence of [1 1 0 0 0 1 −1 0].

In the case of using a 5/32 TASK modulation scheme, a ternary sequence mapped to a binary data sequence may be shown as in Table 7.

TABLE 7

| Binary data sequence 3-tuple | Data symbol $m \in \mathcal{A}$ | Ternary sequence $c_m \in \mathcal{C}$ |
|---|---|---|
| 00000 | 0 | $c_0$ |
| 10000 | 1 | $c_1$ |
| 11000 | 2 | $c_2$ |
| 01000 | 3 | $c_3$ |
| 01100 | 4 | $c_4$ |
| 11100 | 5 | $c_5$ |
| 10100 | 6 | $c_6$ |
| 00100 | 7 | $c_7$ |
| 00110 | 8 | $c_8$ |
| 10110 | 9 | $c_9$ |
| 11110 | 10 | $c_{10}$ |
| 01110 | 11 | $c_{11}$ |
| 01010 | 12 | $c_{12}$ |
| 11010 | 13 | $c_{13}$ |
| 10010 | 14 | $c_{14}$ |
| 00010 | 15 | $c_{15}$ |
| 00011 | 16 | $c_{16}$ |
| 10011 | 17 | $c_{17}$ |
| 11011 | 18 | $c_{18}$ |
| 01011 | 19 | $c_{19}$ |
| 01111 | 20 | $c_{20}$ |
| 11111 | 21 | $c_{21}$ |
| 10111 | 22 | $c_{22}$ |
| 00111 | 23 | $c_{23}$ |
| 00101 | 24 | $c_{24}$ |
| 10101 | 25 | $c_{25}$ |
| 11101 | 26 | $c_{26}$ |
| 01101 | 27 | $c_{27}$ |
| 01001 | 28 | $c_{28}$ |
| 11001 | 29 | $c_{29}$ |
| 10001 | 30 | $c_{30}$ |
| 00001 | 31 | $c_{31}$ |

In Table 7, $C_0$ denotes a sequence of [−1 0 0 1 0 1 −1 0 −1 −1 1 −1 0 1 0 1 0 0 0 1 0 0 1 1 −1 0 0 0 0 0 1 1] and $C_m$ denotes a sequence acquired by cyclically shifting $C_0$ to the right by m. Here, m denotes an integer between 1 and 31.

According to an exemplary embodiment, the ternary sequence mapper may search Table 6 or Table 7 for a ternary sequence corresponding to a binary data sequence, may extract the retrieved ternary sequence as a pre-generated ternary sequence, and may map the pre-generated ternary sequence to the binary data sequence.

The first signal converter 310 may modulate a ternary sequence using a TASK modulation scheme, and may convert the ternary sequence, or a chip sequence of a payload, or a chip sequence of a PPDU, to a first signal.

According to an exemplary embodiment, the first signal converter 310 may modulate a ternary sequence using an amplitude shift keying (ASK) modulation scheme. Here, the first signal converter 310 may map the ternary sequence as shown in Equation 8.

$$A_n = \begin{cases} +A & \text{when } d(n) = +1 \\ 0 & \text{when } d(n) = 0 \\ -A & \text{when } d(n) = -1 \end{cases} \quad \text{[Equation 8]}$$

In Equation 8, $\{d(n)\}$ denotes the ternary sequence, $A_n$ denotes an amplitude of an $n^{th}$ element or chip, and A denotes a transmission voltage level. Gaussian pulse shaping may be employed for the ASK modulation scheme. The respective elements of the ternary sequence may be generated at rates of 1 Mchip/s for 2.4 GHz band; 600 Kchips/s for 780 MHz, 863 MHz, 900 MHz and 950 MHz bands; and 250 Kchips/s for 433 MHz and 470 MHz bands.

Figure 4:
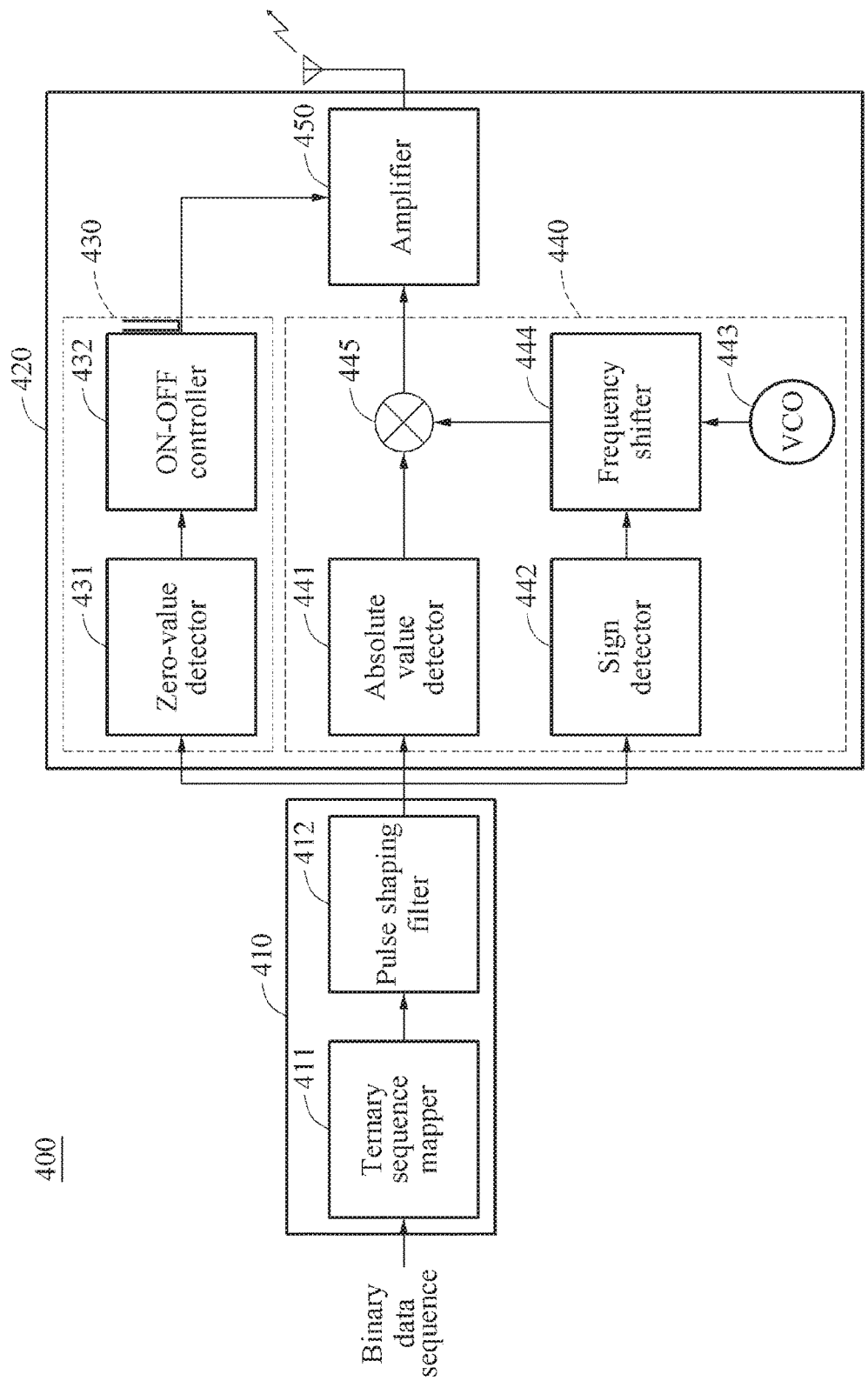
FIGS. 4 through 6 are block diagrams illustrating examples of a transmitter according to another exemplary embodiment.

Also, the first signal converter 310 may include a pulse shaping filter (e.g., pulse shaping filter 412 shown in FIG. 4). The pulse shaping filter may sequentially receive elements of the ternary sequence, thereby enabling a shape of the first signal of a baseband to be smoothly changed instead of being suddenly changed in a time domain. Accordingly, the pulse shaping filter may adjust a frequency band of the first signal not to be widely distributed.

According to an exemplary embodiment, the pulse shaping filter may adjust a transmit power spectrum. The pulse shaping filter may approximate an ideal Gaussian pulse having a section of T and bandwidth-symbol time product (BT) of 0.3 to 0.5. An impulse response of the pulse shaping filter may be represented as Equation 9.

$$g(t) = B\sqrt{\frac{2\pi}{\ln(2)}} e^{-\left(\frac{2\pi B^2 t^2}{\ln(2)}\right)} \quad \text{[Equation 9]}$$

Also, the first signal modulated from the ternary sequence may be represented as Equation 10.

$$x_{BB}(t) = A \sum_{n=1}^{N_{PPDU}} d(n)g(t - nT_{chip}) \quad \text{[Equation 10]}$$

In Equation 10, $d(n) \in \{-1, 0, 1\}$ denotes an element of the ternary sequence, $T_{chip}$ denotes a section of the first signal corresponding to the element, and $N_{PPDU}$ denotes a number of elements of the ternary sequence. Elements of the ternary sequence may be represented as Equation 11.

$$[d(1), \ldots, d(N_{PPDU})] = [\{c^{pre}(1), \ldots, c^{pre}(N_p)\}, \{c^{SFD}(1), \ldots, c^{SFD}(N_s)\}, \{c^{PHR}(1), \ldots, c^{PHR}(N_R)\}, \{c(1), \ldots, c(N_D)\}] \quad \text{[Equation 11]}$$

In Equation 11, $\{c^{pre}(1), \ldots, c^{pre}(N_p)\}$ denotes a chip sequence that configures a preamble field, $\{c^{SFD}(1), \ldots, c^{SFD}(N_s)\}$ denotes a chip sequence that configures a spreading SFD field, $\{c^{PHR}(1), \ldots, c^{PHR}(N_R)\}$ denotes a chip sequence that configures a spreading PHR field, and $\{c(1), \ldots, c(N_D)\}$ denotes a chip sequence that configures an encoded ternary sequence spreading PSDU field.

A pass band of the first signal modulated from the ternary sequence may be represented as Equation 12.

$$X_{PB}(t) = \left[A \sum_{n=1}^{N_{PPDU}} d(n)g(t - nT_{chip})\right] \cos(\omega_c t + \phi) \quad \text{[Equation 12]}$$

In Equation 12, $\omega_c$ denotes an angular frequency of a carrier signal and $\phi \in [0, 2\pi]$ denotes a random phase.

Also, the second signal converter 320 may convert the first signal to a second signal by converting each section of the first signal based on an element of the ternary sequence. The second signal converter 320 may include a zero-value converter configured to convert a section corresponding to an element of 0 in the first signal and an absolute value one converter (absolute value of one converter) configured to convert a section corresponding to an element of 1 and a section corresponding to an element of −1 in the first signal.

The zero-value converter may convert the section corresponding to the element of 0 in the first signal using a zero-value detector and an ON-OFF controller. The zero-value detector may detect the section corresponding to the element of 0 in the first signal. For example, the zero-value detector may detect a section in which an amplitude of the first signal is within a preset range close to 0 as the section corresponding to the element of 0. The ON-OFF controller may turn off an output of the section corresponding to the element of 0 detected at the zero-value detector. Accordingly, an amplitude value of a section corresponding to the element of 0 in the second signal may be zero.

Further, the absolute value one converter may detect the section corresponding to the element of 1 and the section corresponding to the element of −1 in the first signal, and may convert the section corresponding to the element of 1 and the section corresponding to the element of −1 by applying different conversion schemes.

According to an exemplary embodiment, the absolute value one converter may detect the section corresponding to the element of 1 and the section corresponding to the element of −1 in the first signal using an absolute value detector and a sign detector. The absolute value detector may detect a section corresponding to an element of absolute value one in the first signal, for example, a section in which an amplitude of the first signal is greater than or equal to a threshold value, as the section corresponding to the element of the absolute value one. The sign detector may detect a signal of the element of the absolute value one and may classify the section corresponding to the element of the absolute value one into the section corresponding to the element of 1 and the section corresponding to the element of −1. For example, the sign detector may detect a section corresponding to a phase of zero degrees as the section corresponding to the element of 1 and a section corresponding to a phase of 180 degrees as the section corresponding to the element of −1, in the section corresponding to the element of the absolute value one.

Also, the absolute value one converter may convert the selection corresponding to the element of 1 and the section corresponding to the element of −1 using a frequency shifter or/and a phase shifter. For example, when transmitting a second signal to a noncoherent receiver, the absolute value one converter may convert the section corresponding to the element of 1 and the section corresponding to the element of −1 using the frequency shifter. When transmitting a second signal to a coherent receiver, the absolute value one converter may convert the section corresponding to the element of 1 and the section corresponding to the element of −1 using all of the frequency shifter and the phase shifter.

The frequency shifter may shift a frequency of the section corresponding to the element of 1 in the first signal to a frequency $f_1$, and may shift a frequency of the section corresponding to the element of −1 in the first signal to a frequency $f_2$.

For example, when converting the section corresponding to the element of 1 in the first signal, the frequency shifter may shift a frequency of a carrier signal adjusted by voltage controlled oscillation (VCO) to a frequency $f_1$, and the absolute value one converter may multiply the carrier signal shifted to the frequency $f_1$ by an absolute value of an amplitude of the section corresponding to the element of 1. Also, the frequency shifter may shift, to the frequency $f_1$, a frequency of a carrier signal having an envelope that is proportional to the absolute value of the amplitude of the section corresponding to the element of 1. As another example, when converting the section corresponding to the element of −1 in the first signal, the frequency shifter may shift a frequency of a carrier signal adjusted by VCO to a frequency $f_2$, and the absolute value one converter may multiply the carrier signal shifted to the frequency $f_2$ by an absolute value of an amplitude of the section corresponding to the element of −1. Also, the frequency shifter may shift, to the frequency $f_2$, a frequency of a carrier signal having an envelope that is proportional to the absolute value of the amplitude of the section corresponding to the element of −1. According to an exemplary embodiment, the frequency $f_1$ and the frequency $f_2$ may have different frequency bands. For example, the frequency $f_2$ may be greater than the frequency $f_1$.

Also, the phase shifter may shift a phase of the section corresponding to the element of 1 in the first signal to a phase $\theta_1$, and may shift a phase of the section corresponding to the element of −1 to a phase $\theta_2$. For example, the phase shifter may shift a phase of a carrier signal to zero degrees, and the absolute value one converter may multiply the carrier signal shifted to zero degrees by an absolute value of an amplitude of the section corresponding to the element of 1. Also, the phase shifter may shift, to zero degrees, a phase of a carrier signal having an envelope that is proportional to the absolute value of the amplitude of the section corresponding to the element of 1. As another example, the phase shifter may shift a phase of a carrier signal to 180 degrees, and the absolute value one converter may multiply the carrier signal shifted to 180 degrees by an absolute value of an amplitude of the section corresponding to the element of −1. Also, the phase shifter may shift, to 180 degrees, a phase of a carrier signal having an envelope that is proportional to the absolute value of the amplitude of the section corresponding to the element of −1.

According to an exemplary embodiment, the phase shifter may shift, to the phase $\theta_1$, a phase of the section corresponding to the element of 1 shifted to the frequency $f_1$ by the frequency shifter, and may shift, to the phase $\theta_2$, a phase of the section corresponding to the element of −1 shifted to the frequency $f_2$ by the frequency shifter.

Also, the second signal converter 320 may include an amplifier. The amplifier may amplify an amplitude of the converted second signal. The transmitter 300 may transmit the amplified second signal to the noncoherent receiver or the coherent receiver via an antenna.

Figure 5:
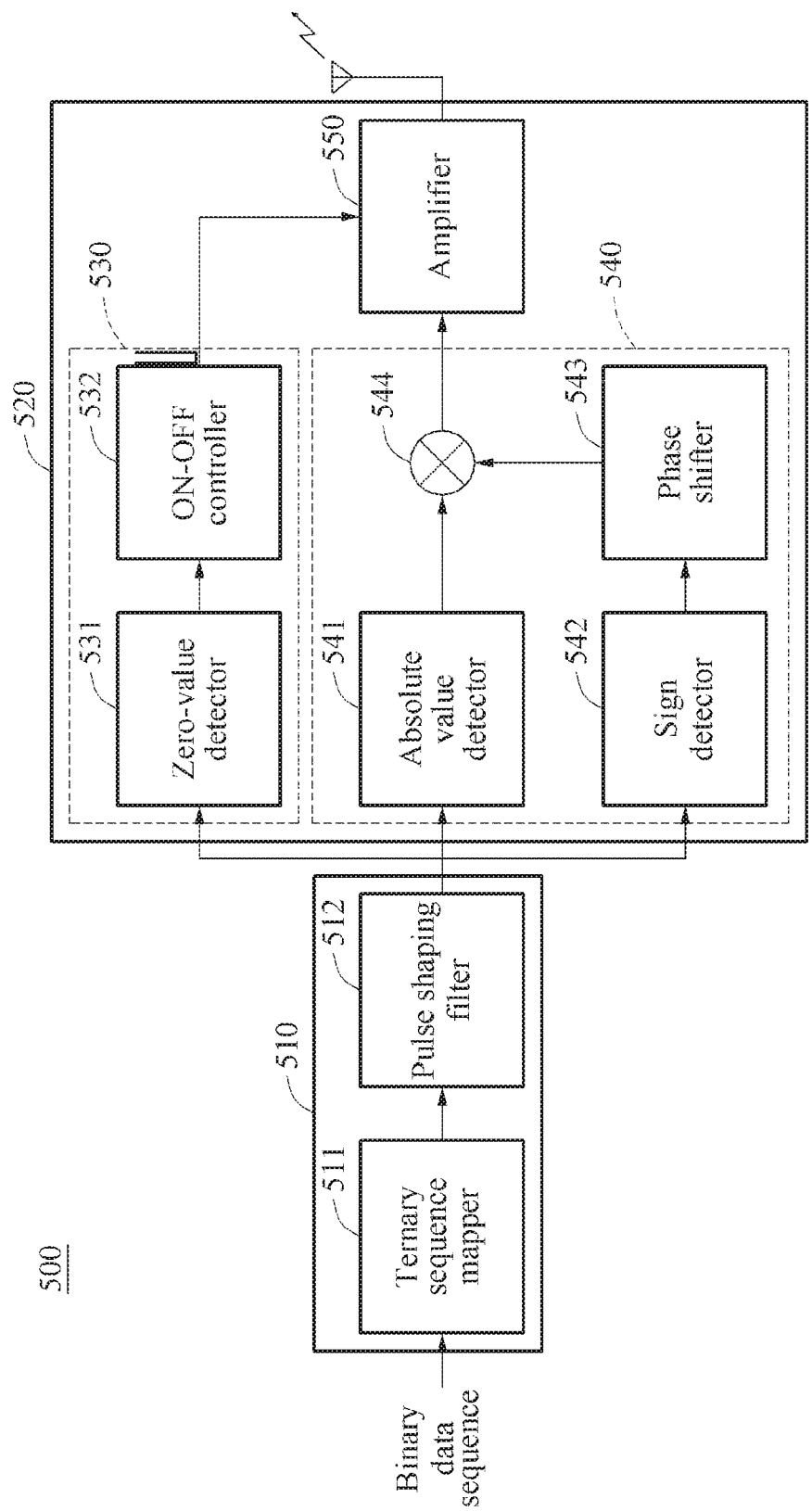
Figure 6:
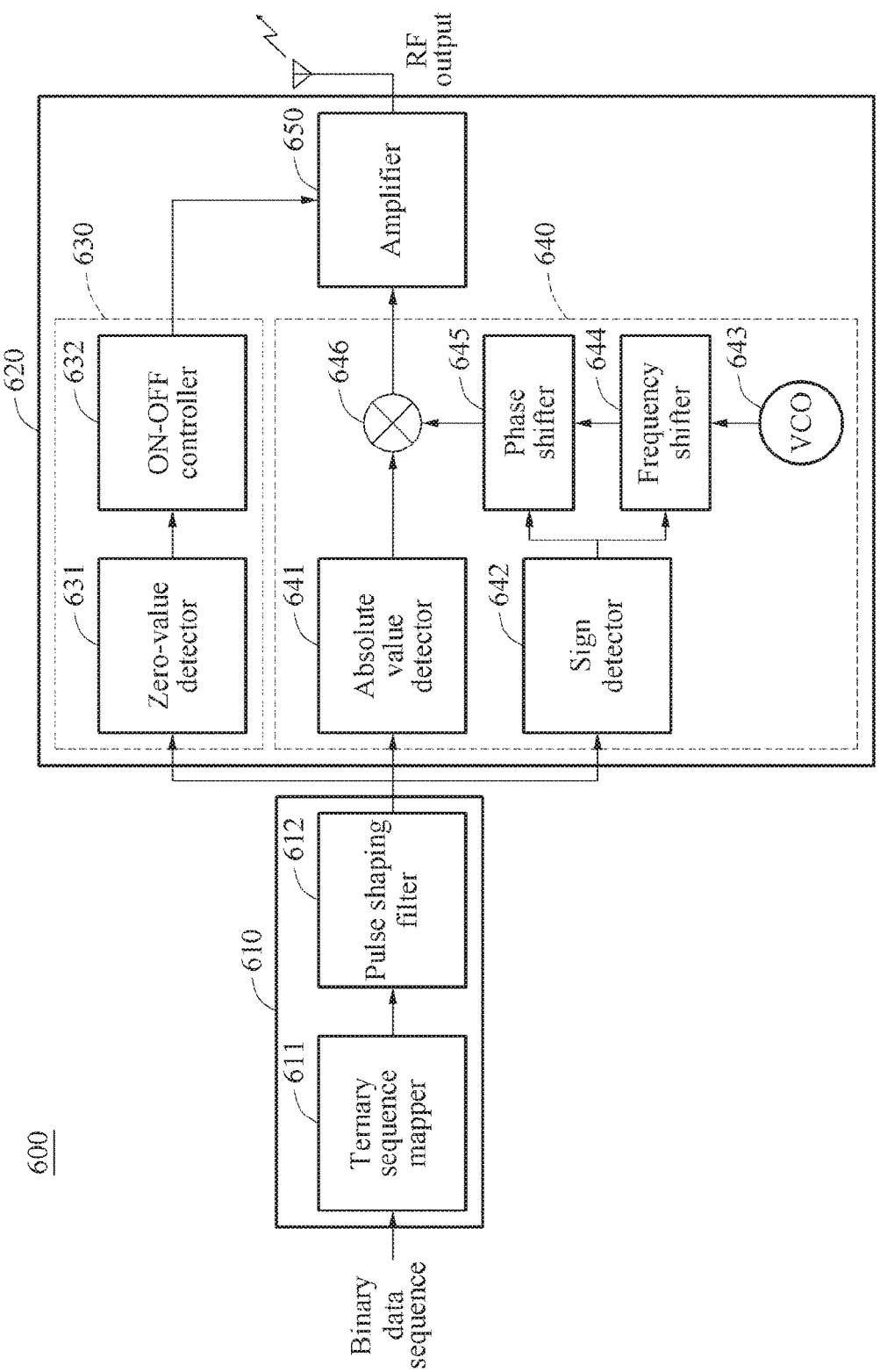

FIGS. 4 through 6 are block diagrams illustrating examples of a transmitter according to another exemplary embodiment.

Referring to FIG. 4, a transmitter 400 may transmit data to a low selectivity noncoherent receiver 120, a high selectivity noncoherent receiver 130, or a coherent receiver 140. The transmitter 400 may include a first signal converter 410 and a second signal converter 420. The first signal converter 410 may include a ternary sequence mapper 411 and a pulse shaping filter 412.

The ternary sequence mapper 411 may generate a ternary sequence by dividing a binary data sequence including elements of 0 or 1 based on a predetermined length, and by mapping a pre-generated ternary sequence to the divided binary data sequence. For example, if a binary data sequence of [1 0 1 0 0 1 1 1 0] is input to the ternary sequence mapper 411, the ternary sequence mapper 411 may divide the binary data sequence into [1 0 1], [0 0 1], and [1 1 0]. The ternary sequence mapper 411 may map the pre-generated ternary sequence to the divided binary data sequence. For example, if a pre-generated ternary sequence corresponding to a divided binary data sequence [1 0 1] is [0 1 −1 0 1 1 0 0], the ternary sequence mapper 411 may generate a ternary sequence [0 1 −1 0 1 1 0 0] by mapping the ternary sequence [0 1 −1 0 1 1 0 0] to the divided binary sequence [1 0 1]. Also, the ternary sequence mapper 411 may modulate a ternary sequence to a first signal.

Also, the ternary sequence mapper 411 may modulate the ternary sequence using an ASK modulation scheme. According to an exemplary embodiment, the ternary sequence mapper 411 may include the converter 310 of FIG. 3. For example, when modulating a ternary sequence [0 1 −1 0 1 1 0 0] to a first signal, an amplitude of a section of the first signal corresponding to 0 of the ternary sequence may be zero, an amplitude of a section of the first signal corresponding to 1 may have a positive value, and an amplitude of a section of the first signal corresponding to −1 may have a negative value.

The pulse shaping filter 412 may sequentially receive elements of the ternary sequence and may adjust a frequency band of the first signal not to be widely distributed.

The second signal converter 420 may include a zero-value converter 430, an absolute value one converter 440, and an amplifier 450.

The zero-value converter 430 may include a zero-value detector 431 and an ON-OFF controller 432. The zero-value detector 431 may detect a section in which an amplitude of the first signal is less than a threshold value as a section corresponding to an element of 0. Here, the threshold value may denote a magnitude of noise of the first signal. The ON-OFF controller 432 may turn off output of the section corresponding to the element of 0 detected at the zero-value detector 431.

The absolute value one converter 440 may include an absolute value detector 441, a sign detector 442, a VCO 443, a frequency shifter 444, and a calculator 445.

The absolute value detector 441 may detect a section in which an amplitude of the first signal is greater than or equal to a threshold value as a section corresponding to an element of an absolute value one. The sign detector 442 may detect a signal of the element of the absolute value one and may classify the section corresponding to the element of the absolute value one into the section corresponding to the element of 1 and the section corresponding to the element of −1. For example, the sign detector 442 may detect a section corresponding to a phase of zero degrees in the section corresponding to the element of the absolute value one as the section corresponding to the element of 1, and may detect the section corresponding to a phase of 180 degrees as the section corresponding to the element of −1.

The VCO 443 may adjust a frequency of a carrier signal. The frequency shifter 444 may shift a frequency of a carrier signal of the section corresponding to the element of 1 to a frequency $f_1$, and may shift a frequency of a carrier signal of the section corresponding to the element of −1 to a frequency $f_2$.

The calculator 445 may generate a second signal by multiplying the carrier signal shifted to the frequency $f_1$ by an absolute value of an amplitude of the section corresponding to the element of 1 and by multiplying the carrier signal shifted to the frequency $f_2$ by an absolute value of an amplitude of the section corresponding to the element of −1.

The amplifier 450 may amplify an amplitude of the second signal. The transmitter 400 may transmit the amplified second signal to the noncoherent receiver 120 or 130 or the coherent receiver 140 via an antenna.

Referring to FIG. 5, a transmitter 500 may transmit data to a low selectivity noncoherent receiver 120, a high selectivity noncoherent receiver 130, or a coherent receiver 140. The transmitter 500 may include a first signal converter 510 and a second signal converter 520. The first signal converter 510 may include a ternary sequence mapper 511 and a pulse shaping filter 512.

The ternary sequence mapper 511 may generate a ternary sequence by receiving a binary data sequence including elements of 0 or 1, by dividing the binary data sequence based on a predetermined length, and by mapping a pre-generated ternary sequence to the divided binary data sequence.

Also, the first signal converter 510 may generate a first signal by modulating the ternary sequence. According to an exemplary embodiment, the ternary sequence mapper 511 may include the converter 310 of FIG. 3.

The pulse shaping filter 512 may sequentially receive elements of the ternary sequence and may adjust a frequency band of the first signal not to be widely distributed.

The second signal converter 520 may include a zero-value converter 530, an absolute value one converter 540, and an amplifier 550.

The zero-value converter 530 may include a zero-value detector 531 and an ON-OFF controller 532. The zero-value detector 531 may detect a section in which an amplitude of the first signal is less than a threshold value as a section corresponding to an element of 0. Here, the threshold value may denote a magnitude of noise of the first signal. The ON-OFF controller 532 may turn off output of the section corresponding to the element of 0 detected at the zero-value detector 531.

The absolute value one converter 540 may include an absolute value detector 541, a sign detector 542, a phase shifter 543, and a calculator 544.

The absolute value detector 541 may detect a section in which an amplitude of the first signal is greater than or equal to a threshold value as a section corresponding to an element of absolute value one. The sign detector 542 may detect a sign of the element of the absolute value one and may classify the section corresponding to the element of the absolute value one into a section corresponding to an element of 1 and a section corresponding to an element of −1.

The phase shifter 543 may shift a phase of a carrier signal of the section corresponding to the element of 1 to a first phase and may shift a phase of a carrier signal of the section corresponding to the element of −1 to a second phase, in the first signal.

The calculator 544 may generate a second signal by multiplying the carrier signal shifted to the first phase by an absolute value of an amplitude of the section corresponding to the element of 1 and by multiplying the carrier signal shifted to the second phase by an absolute value of an amplitude of the section corresponding to the element of −1.

The amplifier 550 may amplify an amplitude of the second signal. The transmitter 500 may transmit the amplified second signal to the noncoherent receiver 120 or 130 or the coherent receiver 140 via an antenna.

Referring to FIG. 6, a transmitter 600 may transmit data to a low selectivity noncoherent receiver 120, a high selectivity noncoherent receiver 130, or a coherent receiver 140. The transmitter 600 may include a first signal converter 610 and a second signal converter 620. The first signal converter 610 may include a ternary sequence mapper 611 and a pulse shaping filter 612.

The ternary sequence mapper 611 may generate a ternary sequence by receiving a binary data sequence including elements of 0 or 1, by dividing the ternary sequence based on a predetermined length, and by mapping a pre-generated ternary sequence to the divided binary data sequence.

Also, the first signal converter 610 may generate a first signal by modulating the ternary sequence. According to an exemplary embodiment, the ternary sequence mapper 611 may include the converter 310 of FIG. 3.

The pulse shaping filter 612 may sequentially receive elements of the ternary sequence and may adjust a frequency band of the first signal not to be widely distributed.

The second signal converter 620 may include a zero-value converter 630, an absolute value one converter 640, and an amplifier 650.

The zero-value converter 630 may include a zero-value detector 631 and an ON-OFF controller 632. The zero-value detector 631 may detect a section in which an amplitude of the first signal is less than a threshold value as a section corresponding to an element of 0. Here, the threshold value may denote a magnitude of noise of the first signal. The ON-OFF controller 632 may turn off output of the section corresponding to the element of 0 detected at the zero-value detector 631.

The absolute value one converter 640 may include an absolute value detector 641, a sign detector 642, a VCO 643, a frequency shifter 644, a phase shifter 645, and a calculator 646.

The absolute value detector 641 may detect a section in which an amplitude of the first signal is greater than or equal to a threshold value as a section corresponding to an element of absolute value one. The sign detector 642 may detect a sign of the element of the absolute value one and may classify the section corresponding to the element of the absolute value one into a section corresponding to an element of 1 and a section corresponding to an element of −1.

The VCO 643 may adjust a frequency of a carrier signal. The frequency shifter 644 may shift a carrier signal of the section corresponding to the element of 1 to a frequency $f_1$, and may shift a carrier signal of the section corresponding to the element of −1 to a frequency $f_2$. The phase shifter 645 may shift, to a phase $\theta_1$, a phase of the carrier signal shifted to the frequency $f_1$ at the frequency shifter 644 and may shift, to a phase $\theta_2$, a phase of the carrier signal shifted to the frequency $f_2$ at the frequency shifter 644

The calculator 646 may generate a second signal by multiplying the carrier signal shifted to the frequency $f_1$ and the phase $\theta_1$ by an absolute value of an amplitude of the section corresponding to the element of 1, and by multiplying the carrier signal shifted to the frequency $f_2$ and the phase $\theta_2$ by an absolute value of an amplitude of the section corresponding to the element of −1.

The amplifier 650 may amplify an amplitude of the second signal. The transmitter 600 may transmit the amplified second signal to the low selectivity noncoherent receiver 120, the high selectivity noncoherent receiver 130, or the coherent receiver 140 via an antenna.

Figure 7:
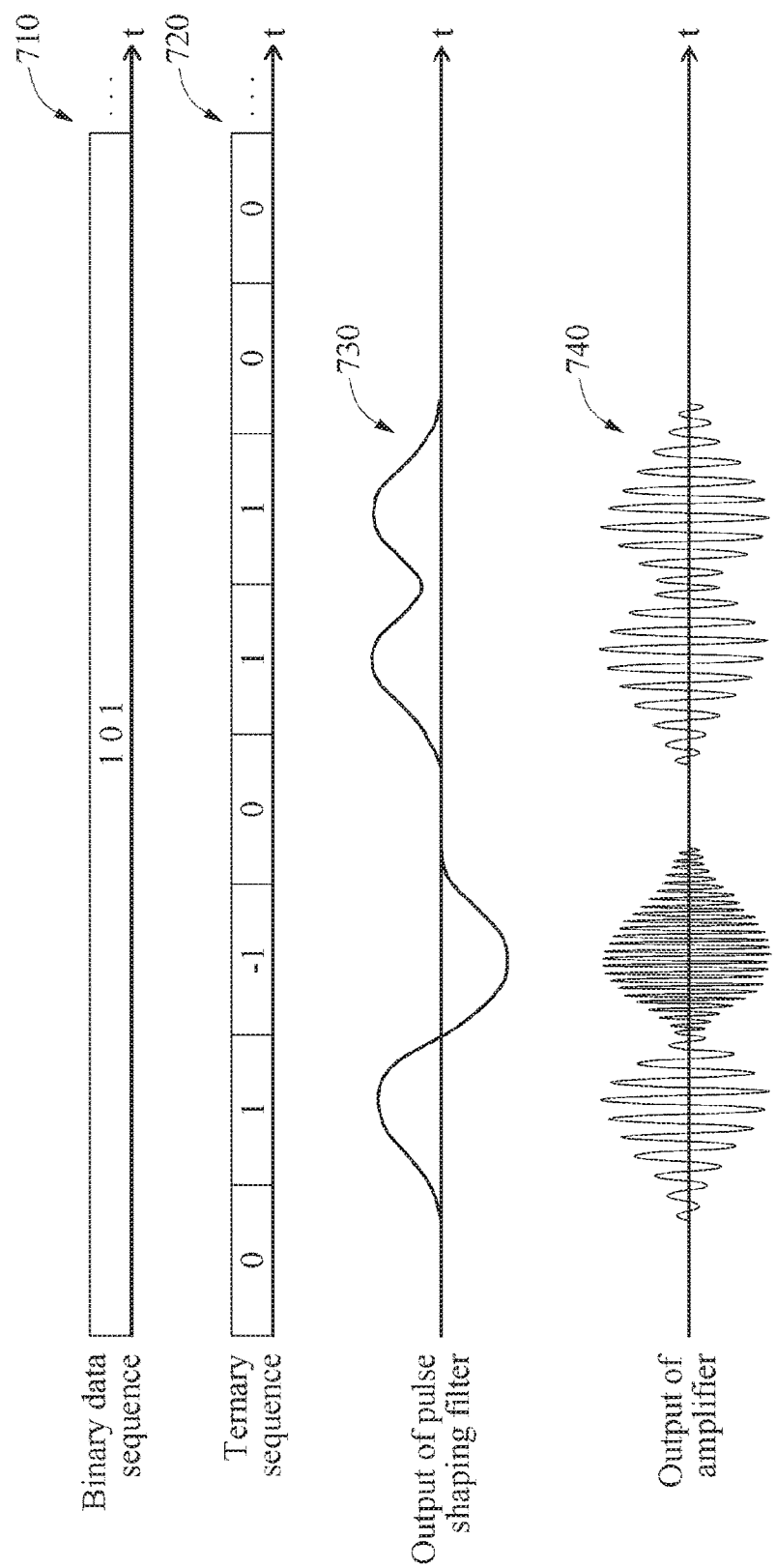
FIGS. 7 through 9 illustrate examples of a transmission signal according to an exemplary embodiment.
Figure 8:
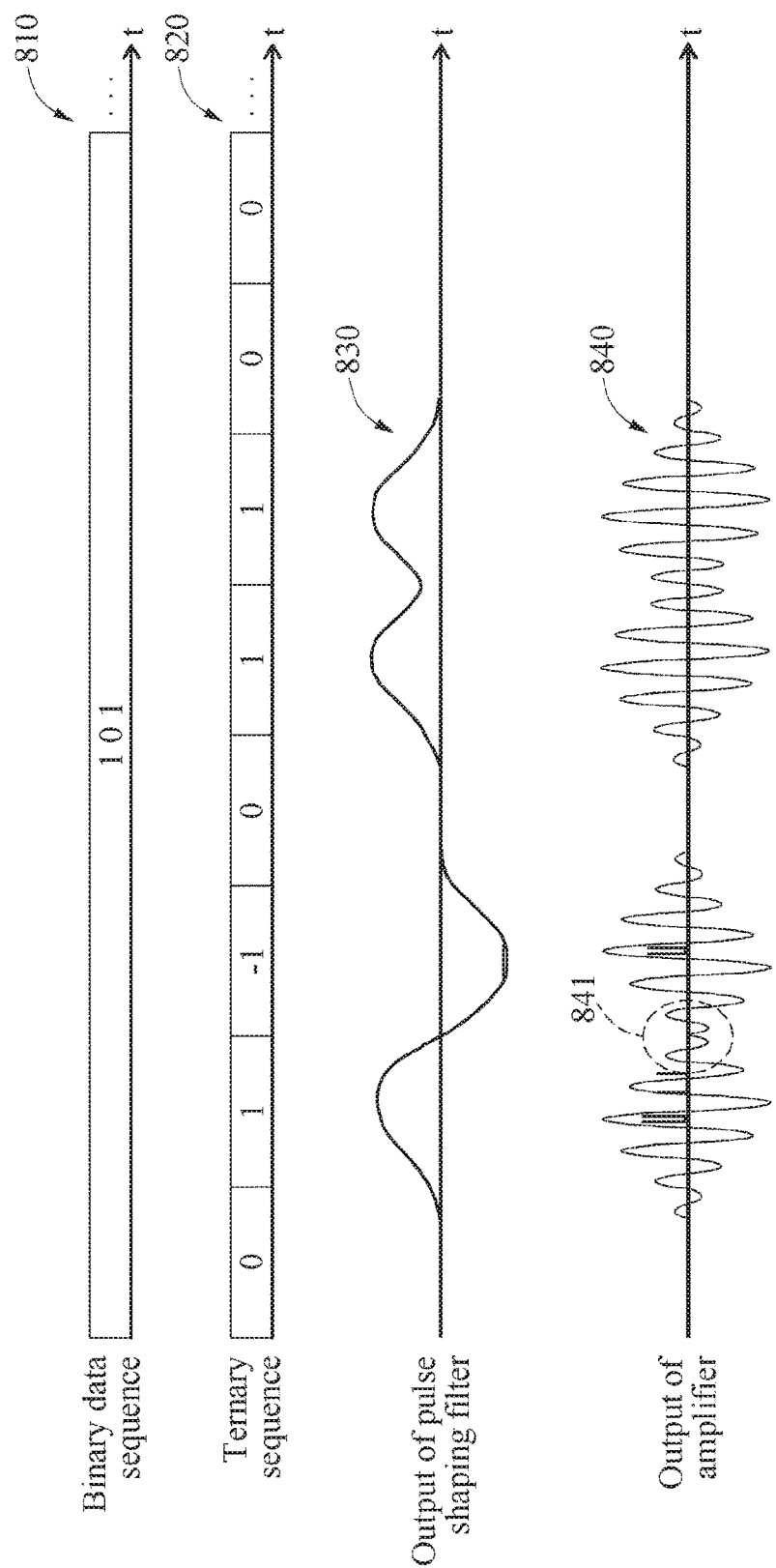
Figure 9:
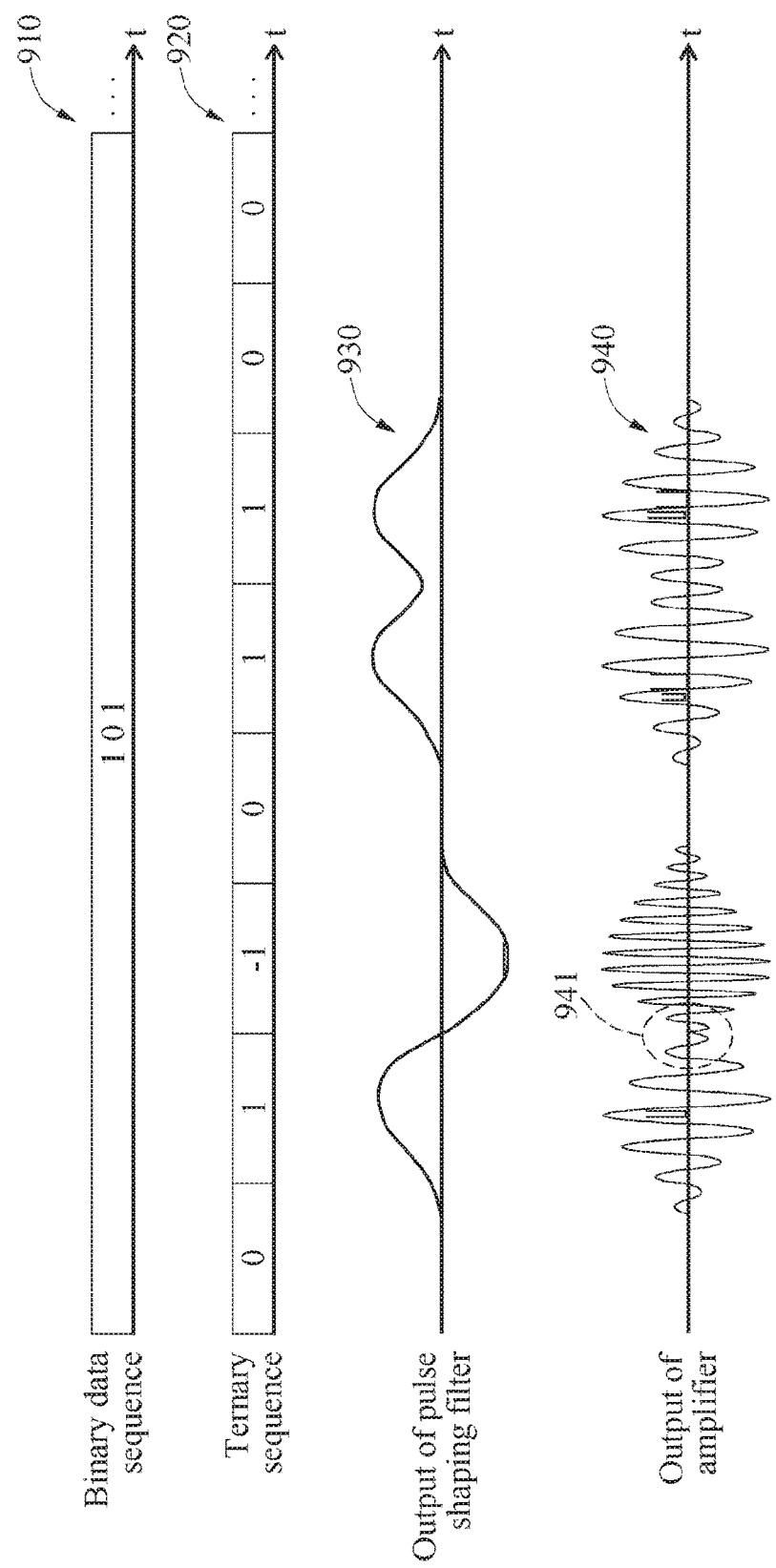

FIGS. 7 through 9 illustrate examples of a transmission signal according to an exemplary embodiment.

Referring to FIG. 7, a transmitter 110 may modulate a binary data sequence, and may transmit the modulated binary data sequence to a low selectivity noncoherent receiver 120, a high selectivity noncoherent receiver 130, or a coherent receiver 140. When the transmitter 110 receives a binary data sequence 710, the transmitter 110 may map the binary data sequence 710 to a ternary sequence 720 that is preset to correspond to the binary data sequence 710 and modulate the ternary sequence 720. The transmitter 110 may input the modulated ternary sequence 720 to a pulse shaping filter and the pulse shaping filter may adjust a frequency band of the modulated ternary sequence 720 to generate a first signal which is not widely distributed. In a pulse shaping filter output signal 730, an amplitude of a section corresponding to an element of 1 may have a positive value, an amplitude of a section corresponding to an element of −1 may have a negative value, and an amplitude of a section corresponding to an element of 0 may be zero.

In the pulse shaping filter output signal 730, the transmitter 110 may shift a frequency of a carrier signal of the section corresponding to the element of 1 to a frequency $f_1$, and may shift a frequency of a carrier signal of the section corresponding to the element of −1 to a frequency $f_2$. Here, an amplitude of the second frequency may be greater than an amplitude of the first frequency. Also, the transmitter 110 may generate a second signal by multiplying the carrier signal shifted to the frequency $f_1$ by an absolute value of an amplitude of the section corresponding to the element of 1 and by multiplying the carrier signal shifted to the frequency $f_2$ by an absolute value of an amplitude of the section corresponding to the element of −1. The transmitter 110 may amplify the second signal by inputting the second signal to an amplifier. In an amplified second signal 740, a frequency of the section corresponding to the element of 1 may be distinguished from a frequency of the section corresponding to the element of −1. An output of the section corresponding to the element of 0 may be zero. The transmitter 110 may transmit the amplified second signal 740 to the low selectivity noncoherent receiver and the high selectivity noncoherent receiver.

Referring to FIG. 8, a transmitter 110 may modulate a binary data sequence, and may transmit the modulated binary data sequence to a low selectivity noncoherent receiver 120, a high selectivity noncoherent receiver 130, or a coherent receiver 140. When the transmitter 110 receives a binary data sequence 810, the transmitter 110 may map the binary data sequence 810 to a ternary sequence 820 that is preset to correspond to the binary data sequence 810, and modulate the ternary sequence 820. The transmitter 110 may input the modulated ternary sequence 820 to a pulse shaping filter and may adjust a frequency band of the modulated ternary sequence 820 to generate a first signal that is not to be widely distributed. In a pulse shaping filter output signal 830, an amplitude of a section corresponding to an element of 1 may have a positive value, an amplitude of a section corresponding to an element of −1 may have a negative value, and an amplitude of a section corresponding to an element of 0 may be zero.

In the pulse shaping filter output signal 830, the transmitter 110 may shift a phase of a carrier signal of the section corresponding to the element of 1 to a phase $\theta_1$, and may shift a phase of a carrier signal of the section corresponding to the element of −1 to a phase $\theta_2$. Here, a difference between the phase $\theta_1$ and the phase $\theta_2$ may be 180 degrees. Also, the transmitter 110 may generate a second signal by multiplying the carrier signal shifted to the phase $\theta_1$ by an absolute value of an amplitude of the section corresponding to the element of 1 and by multiplying the carrier signal shifted to the phase $\theta_2$ by an absolute value of an amplitude of the section corresponding to the element of −1. The transmitter 110 may amplify the second signal by inputting the second signal to an amplifier. As shown in a section 841 of an amplified second signal 840, a difference between a phase of the section corresponding to the element of 1 and a phase of the section corresponding to the element of −1 may be 180 degrees. Also, an output of the section corresponding to the element of 0 may be zero. The transmitter 110 may transmit the amplified second signal 840 to the noncoherent receiver 120 or 130 and the coherent receiver 140.

Referring to FIG. 9, a transmitter 110 may modulate a binary data sequence and may transmit the modulated binary data sequence to a low selectivity noncoherent receiver 120, a high selectivity noncoherent receiver 130, or a coherent receiver 140. When the transmitter 110 receives a binary data sequence 910, the transmitter 110 may map the binary data sequence 910 to a ternary sequence 920 that is preset to correspond to the binary data sequence 910 and modulate the ternary sequence 920. The transmitter 110 may input the modulated ternary sequence 920 to a pulse shaping filter and may adjust a frequency band of the modulated ternary sequence 920 to generate a first signal that is not to be widely distributed. In a pulse shaping filter output signal 930, an amplitude of a section corresponding to an element of 1 may have a positive value, an amplitude of a section corresponding to an element of −1 may have a negative value, and an amplitude of a section corresponding to an element of 0 may be zero.

In the pulse shaping filter output signal 930, the transmitter 110 may shift a frequency of a carrier signal of the section corresponding to the element of 1 to a frequency $f_1$, and may shift a frequency of a carrier signal of the section corresponding to the element of −1 to a frequency $f_2$. Also, the transmitter 110 may shift, to a phase $\theta_1$, a phase of the carrier signal shifted to the frequency $f_1$, and may shift, to a phase $\theta_2$, a phase of the carrier signal shifted to the frequency $f_2$. Here, an amplitude of the frequency $f_2$ may be greater than an amplitude of the frequency $f_1$ and a difference between the phase $\theta_1$ and the phase $\theta_2$ may be 180 degrees. Also, the transmitter 110 may generate a second signal by multiplying the carrier signal shifted to the frequency $f_1$ and the phase $\theta_1$ by an absolute value of an amplitude of the section corresponding to the element of 1 and by multiplying the carrier signal shifted to the frequency $f_2$ and the phase $\theta_2$ by an absolute value of amplitude of the section corresponding to the element of −1. The transmitter 110 may amplify the second signal by inputting the second signal to an amplifier. In a section 941 of an amplified second signal 940, a difference between the phase of the section corresponding to the element of 1 and the phase of the section corresponding to the element of −1 may be 180 degrees. Also, an output of the section corresponding to the element of 0 may be zero. The transmitter 110 may transmit the amplified second signal 940 to the low selectivity noncoherent receiver 120, the high selectivity noncoherent receiver 130, or the coherent receiver 140.

Figure 10:
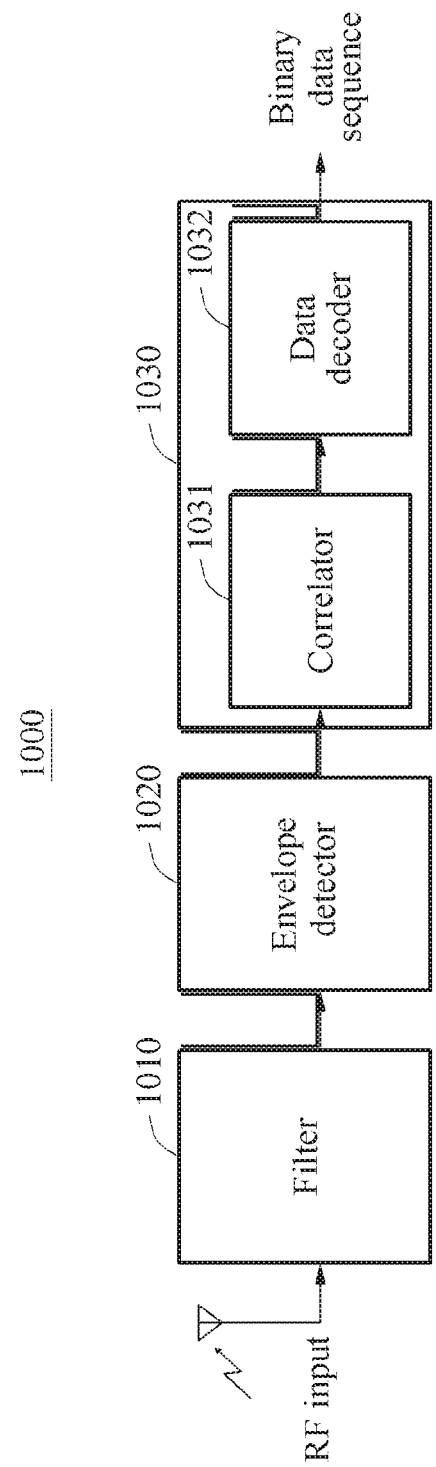
FIGS. 10 through 12 are block diagram illustrating examples of a receiver according to an exemplary embodiment.
Figure 11:
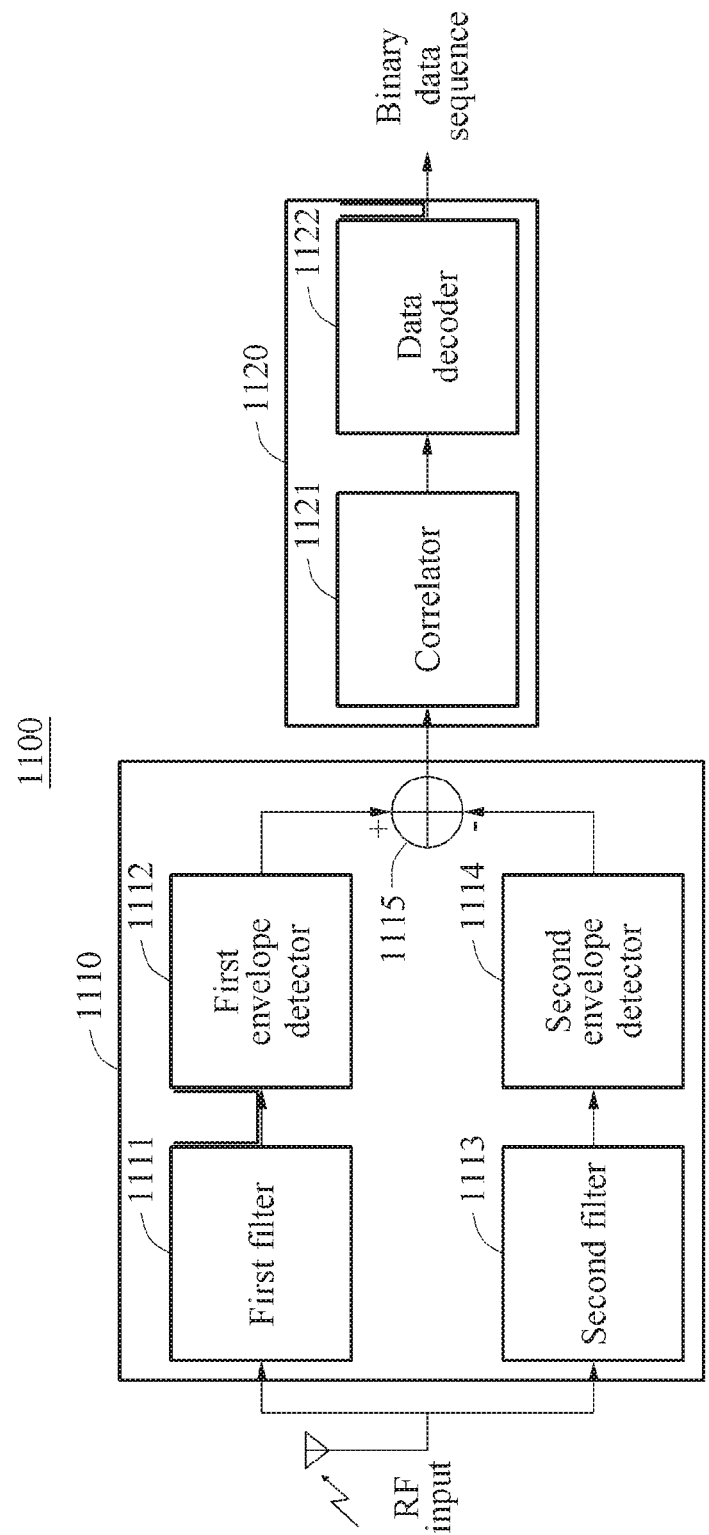
Figure 12:
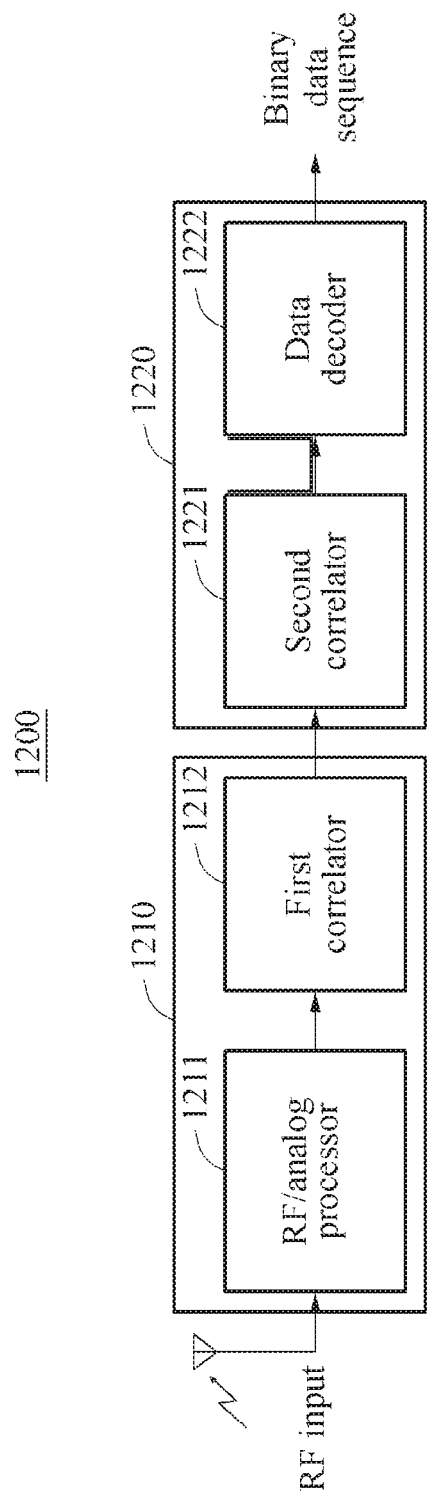

FIGS. 10 through 12 are block diagram illustrating examples of a receiver according to an exemplary embodiment.

Referring to FIG. 10, a receiver 1000 may include a filter 1010, an envelope detector 1020, and a binary data sequence detector 1030. According to an exemplary embodiment, the receiver 1000 may correspond to a low selectivity noncoherent receiver 120 illustrated in FIG. 1.

The receiver 1000 may receive a signal from the transmitter 300 of FIG. 3. The received signal may be a signal converted from a ternary sequence including elements of −1, 0, or 1.

The filter 1010 may filter the received signal using a frequency $f_0$. Here, the frequency $f_0$ may be a frequency between a frequency $f_1$ and a frequency $f_2$. The frequency $f_1$ denotes a frequency of a section of the received signal converted from the element of 1 and the frequency $f_2$ denotes a frequency of a section of the received signal converted from the element of −1, in the ternary sequence. For example, the frequency $f_0$ may be the arithmetic mean between the frequency $f_1$ and the frequency $f_2$. For example, an amplitude of the frequency $f_2$ may be greater than an amplitude of the frequency $f_1$. The low selectivity noncoherent receiver 1000 may not accurately distinguish the frequency $f_1$ from the frequency $f_2$. Accordingly, the filter 1010 may filter the received signal using the frequency $f_0$ between the frequency $f_1$ and frequency $f_2$, and may receive the received signal in a wide bandwidth in order to cover all of the frequency $f_1$ and the frequency $f_2$.

The envelope detector 1020 may detect an amplitude value of an envelope of the filtered received signal. In a section in which an amplitude of the received signal is not zero between the frequency $f_1$ and the frequency $f_2$, the envelope detector 1020 may detect an envelope of which an amplitude is not zero in the corresponding section. In a section in which an amplitude of the received signal is zero between the frequency $f_1$ and the frequency $f_2$, the envelope detector 1020 may detect a signal of which an amplitude is zero in the corresponding section and that contains only noise. Accordingly, if a signal to noise ratio (SNR) value is greater than or equal to a preset value, the frequency $f_1$ and the frequency $f_2$ may not be distinguished in an envelope, and the receiver 1000 may not distinguish the element of 1 of the ternary sequence from the element of −1 of the ternary sequence.

The binary data sequence detector 1030 may detect a binary data sequence corresponding to the ternary sequence based on a correlation between the detected amplitude value of the envelope and desired binary sequences. The binary data sequence detector 1030 may include a correlator 1031 and a data decoder 1032.

The correlator 1031 may calculate the correlation between the detected amplitude value and desired binary sequences. For example, the correlator 1031 may calculate a correlation between an amplitude value of each section of the envelope detected at the envelope detector 1020 and desired binary sequences.

The binary data sequence detector 1030 may detect, as the binary data sequence, a bit sequence corresponding to a binary sequence having a highest correlation with the detected amplitude value of the envelope among the binary sequences.

According to an exemplary embodiment, the binary data sequence detector 1030 may include information regarding Table 6 or Table 7. The binary data sequence detector 1030 may extract desired binary sequences by converting an element of −1 to an absolute value in the ternary sequences of Table 6 or Table 7. The binary data sequence detector 1030 may calculate a correlation between the binary sequences and the detected amplitude value of the envelope, may search for a bit sequence corresponding to the binary sequence having the highest correlation from Table 6 or Table 7, and may detect the retrieved bit sequence as the binary data sequence.

For example, the correlator 1031 may calculate a correlation between desired binary sequences [0 0 0 1 1 0 1 1], [1 0 0 0 1 1 0 1], [1 1 0 0 0 1 1 0], and [0 0 1 1 0 1 1 0] and an amplitude value of each section of an envelope. In this example, if the binary sequence [1 0 0 0 1 1 0 1] has a highest correlation among the binary sequences, the binary data sequence detector 1030 may extract a bit sequence, for example, [1 0 0], corresponding to the binary sequence [1 0 0 0 1 1 0 1] as a binary data sequence.

The data decoder 1032 may decode the binary data sequence.

Referring to FIG. 11, a receiver 1100 may include an entire envelope detector 1110 and a binary data sequence detector 1120. According to an exemplary embodiment, the receiver 1100 may correspond to a high selectivity noncoherent receiver 130 illustrated in FIG. 1.

The receiver 1100 may receive a signal from the transmitter 300, 400, or 500 described with reference to FIGS. 3 and 5. The received signal may be a signal converted from a ternary sequence including elements of −1, 0, or 1. The entire envelope detector 1110 may detect an amplitude value of an envelope of the received signal.

The entire envelope detector 1110 may include a first filter 1111, a first envelope detector 1112, a second filter 1113, a second envelope detector 1114, and a calculator 1115.

The first filter 1111 may filter the received signal using a frequency $f_1$, and the second filter 1112 may filter the received signal using a frequency $f_2$. Here, the frequency $f_1$ may denote a frequency of a section of the received signal in which the element of 1 in the ternary sequence is converted, and the frequency $f_2$ may denote a frequency of a section of the received signal in which the element of −1 in the ternary sequence is converted. For example, an amplitude of the frequency $f_2$ may be greater than an amplitude of the frequency $f_1$.

The first envelope detector 1112 may detect a first envelope indicating an envelope of the received signal filtered based on the frequency $f_1$. In a section in which an amplitude of the received signal is not zero at the frequency $f_1$, the first envelope detector 1112 may detect an envelope of which an amplitude is not zero in the corresponding section. In a section in which the amplitude of the received signal is zero at the frequency $f_1$, the first envelope detector 1112 may detect a signal of which an amplitude is zero in the corresponding section and that contains only noise. Also, in a section in which the amplitude of the received signal is not zero at the frequency $f_2$, the first envelope detector 1112 may detect a signal of which an amplitude is zero in the corresponding section and that contains only noise.

The second envelope detector 1114 may detect a second envelope indicating an envelope of the received signal filtered based on the frequency $f_2$. In a section in which an amplitude of the received signal is not zero at the frequency $f_2$, the second envelope detector 1114 may detect an envelope of which an amplitude is not zero in the corresponding section. In a section in which the amplitude of the received signal is zero at the frequency $f_2$, the second envelope detector 1114 may detect a signal of which an amplitude is zero in the corresponding section and that contains only noise. Also, in a section in which the amplitude of the received signal is not zero at the frequency $f_1$, the second envelope detector 1114 may detect a signal of which an amplitude is zero in the corresponding section and that contains only noise.

The calculator 1115 may deduct an envelope output from the second envelope detector 1114 from an envelope output from the first envelope detector 1112. Accordingly, in the section in which the amplitude of the received signal is not zero at the frequency $f_1$, the calculator 1115 may output an envelope having a positive amplitude value in the corresponding section. In the section in which the amplitude of the received signal is not zero at the frequency $f_2$, the calculator 1115 may output an envelope having a negative amplitude value in the corresponding section. Also, in the section in which the amplitude of the received signal is zero at the frequency $f_1$ and the frequency $f_2$, the calculator 1115 may output an envelope having zero amplitude value in the corresponding section.

The binary data sequence detector 1120 may detect the binary data sequence corresponding to the ternary sequence based on the correlation between the desired ternary sequences and the amplitude value of the envelope detected at the entire envelope detector 1110. The binary data sequence detector 1120 may include a correlator 1121 and a data decoder 1122.

The correlator 1121 may calculate a correlation between the amplitude value of the envelope and each of the ternary sequences. For example, the correlator 1121 may calculate a correlation between an amplitude value of each section of a third envelope and each of the ternary sequences.

The binary data sequence detector 1120 may detect, as the binary data sequence, a bit sequence corresponding to a ternary sequence having a highest correlation with the detected amplitude value of the envelope among the ternary sequences.

According to an exemplary embodiment, the binary data sequence detector 1120 may include information regarding Table 6 or Table 7. The binary data sequence detector 1120 may calculate a correlation between the ternary sequences of Table 6 or Table 7 and the detected amplitude value of the envelope, may search for a bit sequence corresponding to the ternary sequence having the highest correlation from Table 6 or Table 7, and may detect the retrieved bit sequence as the binary data sequence.

For example, the correlator 1121 may calculate a correlation between desired binary sequences [0 0 0 1 −1 0 1 1], [1 0 0 0 1 −1 0 1], [1 1 0 0 0 1 −1 0], and [0 0 1 −1 0 1 1 0] and an amplitude value of each section of an envelope. In this example, if the binary sequence [1 0 0 0 1 −1 0 1] has a highest correlation among the binary sequences, the binary data sequence detector 1120 may extract a bit sequence, for example, [1 0 0], corresponding to the binary sequence [1 0 0 0 1 −1 0 1] as a binary data sequence.

The data decoder 1122 may decode the binary data sequence.

Referring to FIG. 12, the receiver 1200 may include a correlation detector 1210 and a binary data sequence detector 1220. According to an exemplary embodiment, the receiver 1200 may correspond to a coherent receiver 140 of FIG. 1.

The receiver 1200 may receive a signal from the transmitter described with reference to FIGS. 3 and 6. The received signal may be a signal converted from a ternary sequence including elements of −1, 0, or 1. The correlation detector 1210 may detect a correlation between the received signal and a carrier signal. The correlation detector 1210 may include a radio frequency (RF)/analog processor 1211 and a first correlator 1212.

The RF/analog processor 1211 may convert the received signal, received via an antenna, to be processed at the first correlator 1212. The first correlator 1212 may detect a correlation between a reference signal and the received signal. For example, a phase detector may calculate a correlation between a sinusoidal carrier signal and the received signal.

The binary data sequence detector 1220 may detect a binary data sequence of the received signal based on a correlation between a result value of the correlation and desired ternary sequences. The binary data sequence detector 1220 may include a second correlator 1221 and a data decoder 1222.

The second correlator 1221 may calculate a correlation between a result value of the correlation calculated at the first correlator 1212 and the ternary sequences. The binary data sequence detector 1220 may detect, as the binary data sequence, a bit sequence corresponding to a ternary sequence having a highest correlation with the result value of the correlation calculated at the first correlator 1212 among the ternary sequences.

According to an exemplary embodiment, the binary data sequence detector 1220 may include information regarding Table 6 or Table 7. The binary data sequence detector 1220 may calculate a correlation between the ternary sequences of Table 6 or Table 7 and the amplitude value of the envelope, may search for a bit sequence corresponding to the ternary sequence having the highest correlation from Table 6 or Table 7, and may detect the retrieved bit sequence as the binary data sequence.

The data decoder 1222 may decode the binary data sequence.

Figure 13:
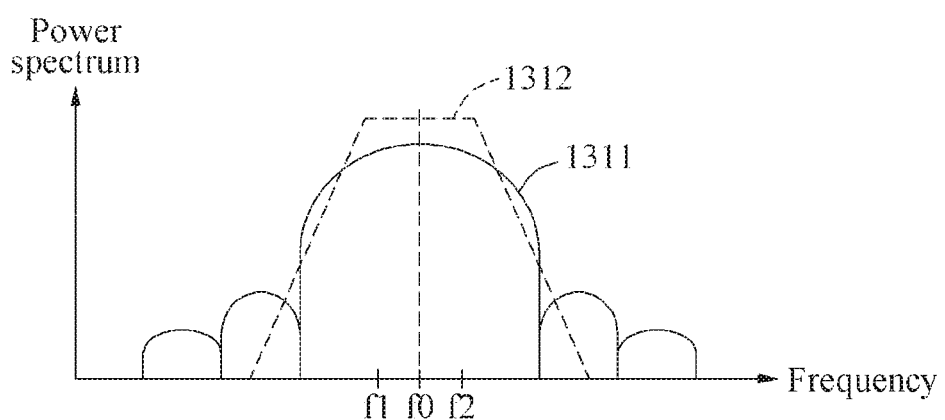
FIGS. 13 through 15 illustrate examples of detecting a binary data sequence according to an exemplary embodiment.
Figure 14:
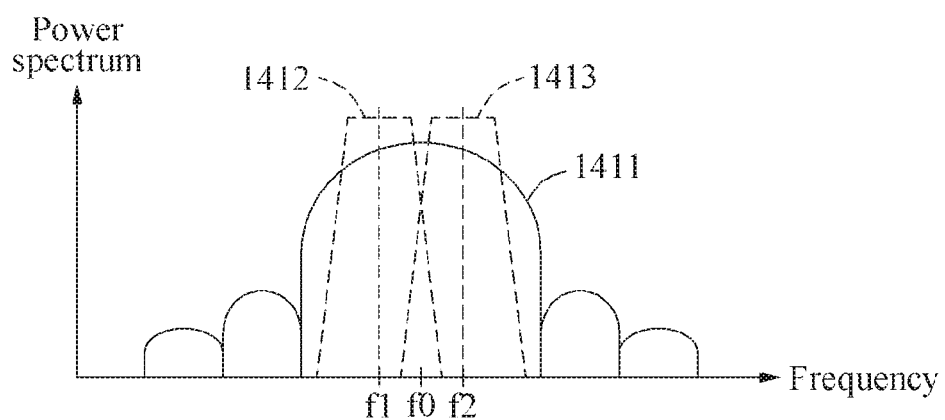
Figure 15:
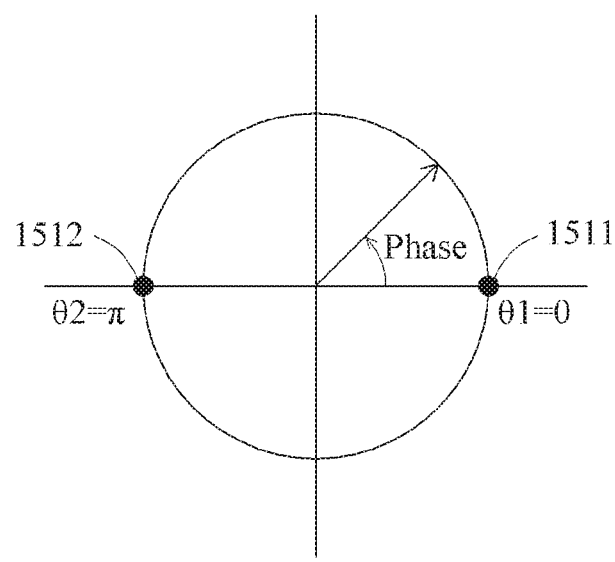

FIGS. 13 through 15 illustrate examples of detecting a binary data sequence according to an exemplary embodiment.

A graph of FIG. 13 shows a spectrum 1311 of a transmission signal transmitted from a transmitter and a filter frequency response 1312 at a low selectivity noncoherent receiver. In the graph, a horizontal axis denotes a frequency and a vertical axis denotes a spectrum power.

A frequency $f_1$ of the spectrum 1311 may denote a frequency of a section of the transmission signal converted from an element of 1 in a ternary sequence, and a frequency $f_2$ may denote a frequency of a section of the transmission signal converted from an element of −1 in the ternary sequence. According to an exemplary embodiment, a frequency $f_0$ may be the arithmetic mean of the frequency $f_1$ and the frequency $f_2$.

The low selectivity noncoherent receiver may not accurately distinguish the frequency $f_1$ and the frequency $f_2$ from each other. Accordingly, to cover all of the frequency $f_1$ and the frequency $f_2$, the low selectivity noncoherent receiver may filter the received signal based on the frequency $f_0$ that is an intermediate frequency between the frequency $f_1$ and the frequency $f_2$ using the filter frequency response 1312.

The low selectivity noncoherent receiver may detect an envelope of the filtered received signal. The low selectivity noncoherent receiver may detect a binary data sequence corresponding to the ternary sequence based on a correlation between an amplitude value of the envelope and desired binary sequences.

A graph of FIG. 14 shows a spectrum 1411 of a transmission signal transmitted from a transmitter and filter frequency responses 1412 and 1413 at a high selectivity noncoherent receiver. In the graph, a horizontal axis denotes a frequency and a vertical axis denotes a spectrum power.

The transmitter may transmit a transmission signal having the spectrum 1411 to the high selectivity noncoherent receiver.

A frequency $f_1$ of the spectrum 1411 may denote a frequency of a section of the transmission signal converted from an element of 1 in a ternary sequence, and a frequency $f_2$ may denote a frequency of a section of the transmission signal converted from an element of −1 in the ternary sequence. According to an exemplary embodiment, a frequency $f_0$ may be the arithmetic mean of the frequency $f_1$ and the frequency $f_2$.

The high selectivity noncoherent receiver may filter the received signal using a first filter in which the frequency $f_1$ is set as a center frequency and a second filter in which the frequency $f_2$ is set as a center frequency. The first filter may filter the received signal based on the frequency $f_1$ using the filter frequency response 1412, and the second filter may filter the received signal based on the frequency $f_2$ using the filter frequency response 1413.

The high selectivity noncoherent receiver may detect an envelope of the received signal filtered based on the frequency $f_1$ and an envelope of the received signal filtered based on the frequency $f_2$, and may deduct the envelope of the received signal filtered based on the frequency $f_2$ from the envelope of the received signal filtered based on the frequency $f_1$. Accordingly, a section in which the amplitude of the received signal is not zero at the frequency $f_1$ may appear as an envelope having a positive amplitude value. A section in which the amplitude of the received signal is not zero at the frequency $f_2$ may appear as an envelope having a negative amplitude value. A section in which the amplitude of the received signal is zero at the frequency $f_1$ and the frequency $f_2$ may appear as an amplitude having zero amplitude value.

The high selectivity noncoherent receiver may detect a binary data sequence corresponding to the ternary sequence based on the correlation between the amplitude value of the amplitude and the desired ternary sequences.

Referring to FIG. 15, coordinates may indicate a phase $\theta_1$ 1511 of a section corresponding to an element of 1 and a phase $\theta_2$ 1512 of a section corresponding to an element of −1 in a ternary sequence of a received signal received at a coherent receiver. Here, the phase $\theta_1$ 1511 may indicate zero degrees and the phase $\theta_2$ 1512 may indicate 180 degrees.

The coherent receiver may detect a correlation between a sinusoidal carrier signal and the received signal.

Also, the coherent receiver may detect a binary data sequence corresponding to the ternary sequence based on a correlation between a correlation result value and a desired ternary sequence.

Figure 16:
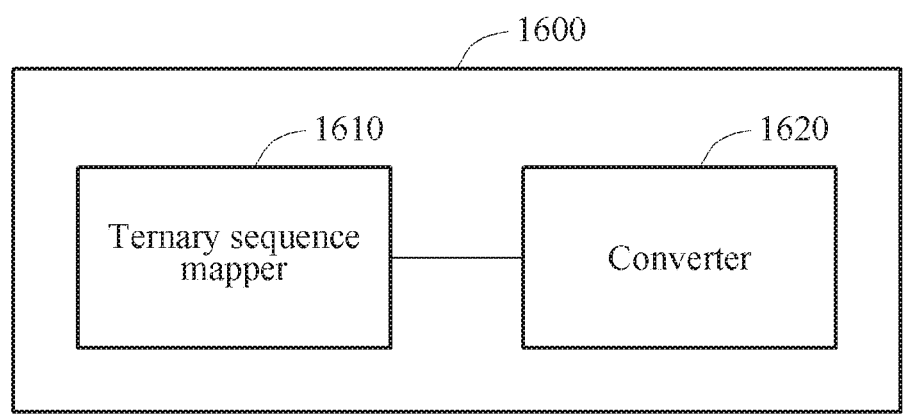
FIG. 16 is a block diagram illustrating a transmitter according to another exemplary embodiment.

FIG. 16 is a block diagram illustrating a transmitter according to another exemplary embodiment.

Referring to FIG. 16, a transmitter 1600 may include a ternary sequence mapper 1610 and a converter 1620. According to an exemplary embodiment, the transmitter 1600 may include the first signal converter 310 of FIG. 3.

The ternary sequence mapper 1610 may generate a ternary sequence including elements of −1, 0, or 1 by mapping a pre-generated ternary sequence to a binary data sequence.

According to an exemplary embodiment, the ternary sequence mapper 1610 may extract, from Table 8, a ternary sequence corresponding to the binary data sequence as the pre-generated ternary sequence. In Table 8, $C_0$ denotes a sequence of [0 0 0 1 −1 0 1 1] and $C_m$ denotes a sequence acquired by cyclically shifting $C_0$ to the right by m. Here, m denotes an integer between 1 and 7.

TABLE 8

| Binary data sequence 3-tuple | Data symbol $m \in \mathcal{A}$ | Ternary sequence $c_m \in \mathbf{C}$ |
|---|---|---|
| 000 | 0 | $c_0$ |
| 100 | 1 | $c_1$ |
| 110 | 2 | $c_2$ |
| 010 | 3 | $c_3$ |
| 011 | 4 | $c_4$ |
| 111 | 5 | $c_5$ |
| 101 | 6 | $c_6$ |
| 001 | 7 | $c_7$ |

According to another exemplary embodiment, the ternary sequence mapper 1610 may extract, from Table 9, the ternary sequence corresponding to the binary data sequence as the pre-generated ternary sequence. In Table 9, $C_0$ denotes a sequence of [−1 0 0 1 0 1 −1 0 −1 −1 1 −1 0 1 0 1 0 0 0 1 0 0 1 1 −1 0 0 0 0 1 1] and $C_m$ denotes a sequence acquired by cyclically shifting $C_0$ to the right by m. Here, m denotes an integer between 1 and 31.

TABLE 9

| Binary data sequence 5-tuple | Data symbol $m \in \mathcal{A}$ | Ternary sequence $c_m \in \mathbf{C}$ |
|---|---|---|
| 00000 | 0 | $c_0$ |
| 10000 | 1 | $c_1$ |
| 11000 | 2 | $c_2$ |
| 01000 | 3 | $c_3$ |
| 01100 | 4 | $c_4$ |
| 11100 | 5 | $c_5$ |
| 10100 | 6 | $c_6$ |
| 00100 | 7 | $c_7$ |
| 00110 | 8 | $c_8$ |
| 10110 | 9 | $c_9$ |
| 11110 | 10 | $c_{10}$ |
| 01110 | 11 | $c_{11}$ |
| 01010 | 12 | $c_{12}$ |
| 11010 | 13 | $c_{13}$ |
| 10010 | 14 | $c_{14}$ |
| 00010 | 15 | $c_{15}$ |
| 00011 | 16 | $c_{16}$ |
| 10011 | 17 | $c_{17}$ |
| 11011 | 18 | $c_{18}$ |
| 01011 | 19 | $c_{19}$ |
| 01111 | 20 | $c_{20}$ |
| 11111 | 21 | $c_{21}$ |
| 10111 | 22 | $c_{22}$ |
| 00111 | 23 | $c_{23}$ |
| 00101 | 24 | $c_{24}$ |
| 10101 | 25 | $c_{25}$ |
| 11101 | 26 | $c_{26}$ |
| 01101 | 27 | $c_{27}$ |
| 01001 | 28 | $c_{28}$ |
| 11001 | 29 | $c_{29}$ |

TABLE 9-continued

| Binary data sequence 5-tuple | Data symbol $m \in \mathcal{A}$ | Ternary sequence $c_m \in \mathbb{C}$ |
|---|---|---|
| 10001 | 30 | $c_{30}$ |
| 00001 | 31 | $c_{31}$ |

The converter 1620 may convert the ternary sequence to a signal.

The description made above with reference to FIGS. 1 through 15 may be applicable to the transmitter of FIG. 16, and a further description related thereto will be omitted.

Figure 17:
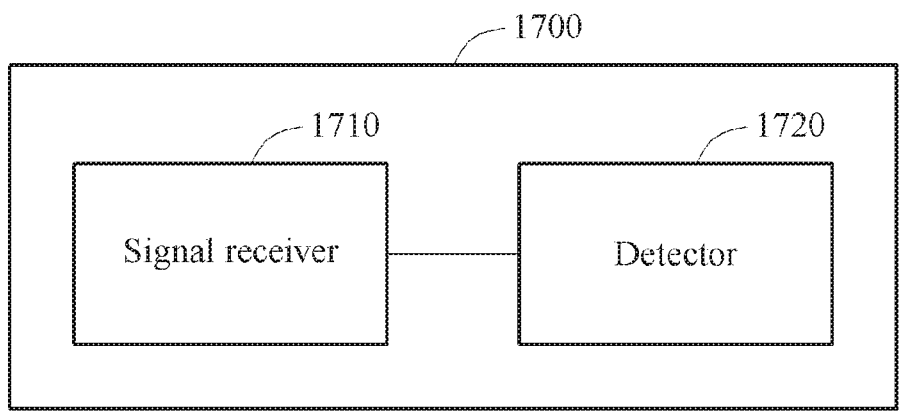
FIG. 17 is a block diagram illustrating a receiver according to another exemplary embodiment.

FIG. 17 is a block diagram illustrating a receiver according to another exemplary embodiment.

Referring to FIG. 17, a receiver 1700 may include a signal receiver 1710 and a detector 1720. According to an exemplary embodiment, the receiver 1700 may refer to the receiver 1200, 1300, 1400 described with reference to FIGS. 10 through 12.

The signal receiver 1710 may receive a signal demodulated from a ternary sequence generated by mapping a pre-generated ternary sequence to a binary data sequence and including elements of −1, 0, or 1.

The detector 1720 may detect the pre-generated ternary sequence and the binary data sequence.

According to an exemplary embodiment, the detector 1720 may detect the pre-generated ternary sequence and the binary data sequence using Table 10. In Table 10, $C_0$ denotes a sequence of [0 0 0 1 −1 0 1 1] and $C_m$ denotes a sequence acquired by cyclically shifting $C_0$ to the right by m. Here, m denotes an integer between 1 and 7.

TABLE 10

| Binary data sequence 3-tuple | Data symbol $m \in \mathcal{A}$ | Ternary sequence $c_m \in \mathbb{C}$ |
|---|---|---|
| 000 | 0 | $c_0$ |
| 100 | 1 | $c_1$ |
| 110 | 2 | $c_2$ |
| 010 | 3 | $c_3$ |
| 011 | 4 | $c_4$ |
| 111 | 5 | $c_5$ |
| 101 | 6 | $c_6$ |
| 001 | 7 | $c_7$ |

According to another exemplary embodiment, the detector 1720 may detect the pre-generated ternary sequence and the binary data sequence using Table 11. In Table 11, $C_0$ denotes a sequence of [−1 0 0 1 0 1 −1 0 −1 −1 1 −1 0 1 0 1 0 0 0 1 0 0 1 1 −1 0 0 0 0 1 1] and $C_m$ denotes a sequence acquired by cyclically shifting $C_0$ to the right by m. Here, m denotes an integer between 1 and 31.

TABLE 11

| Binary data sequence 5-tuple | Data symbol $m \in \mathcal{A}$ | Ternary sequence $c_m \in \mathbb{C}$ |
|---|---|---|
| 00000 | 0 | $c_0$ |
| 10000 | 1 | $c_1$ |
| 11000 | 2 | $c_2$ |
| 01000 | 3 | $c_3$ |
| 01100 | 4 | $c_4$ |
| 11100 | 5 | $c_5$ |
| 10100 | 6 | $c_6$ |
| 00100 | 7 | $c_7$ |
| 00110 | 8 | $c_8$ |
| 10110 | 9 | $c_9$ |
| 11110 | 10 | $c_{10}$ |

TABLE 11-continued

| Binary data sequence 5-tuple | Data symbol $m \in \mathcal{A}$ | Ternary sequence $c_m \in \mathbb{C}$ |
|---|---|---|
| 01110 | 11 | $c_{11}$ |
| 01010 | 12 | $c_{12}$ |
| 11010 | 13 | $c_{13}$ |
| 10010 | 14 | $c_{14}$ |
| 00010 | 15 | $c_{15}$ |
| 00011 | 16 | $c_{16}$ |
| 10011 | 17 | $c_{17}$ |
| 11011 | 18 | $c_{18}$ |
| 01011 | 19 | $c_{19}$ |
| 01111 | 20 | $c_{20}$ |
| 11111 | 21 | $c_{21}$ |
| 10111 | 22 | $c_{22}$ |
| 00111 | 23 | $c_{23}$ |
| 00101 | 24 | $c_{24}$ |
| 10101 | 25 | $c_{25}$ |
| 11101 | 26 | $c_{26}$ |
| 01101 | 27 | $c_{27}$ |
| 01001 | 28 | $c_{28}$ |
| 11001 | 29 | $c_{29}$ |
| 10001 | 30 | $c_{30}$ |
| 00001 | 31 | $c_{31}$ |

The description made above with reference to FIGS. 1 through 15 may be applicable to the receiver of FIG. 17, and a further description related thereto will be omitted.

Figure 18:
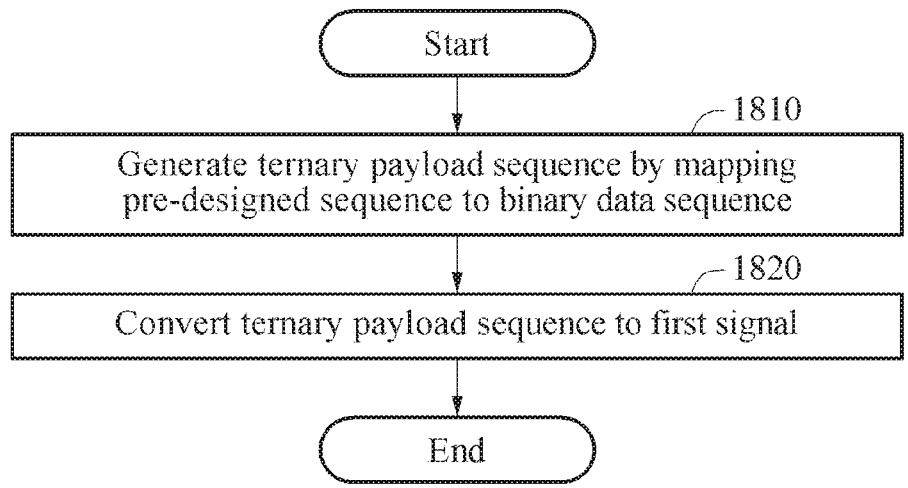
FIG. 18 is a flowchart illustrating a transmission method according to an exemplary embodiment.

FIG. 18 is a flowchart illustrating a transmission method according to an exemplary embodiment.

Referring to FIG. 18, in operation 1810, a transmitter may generate a ternary sequence by mapping a pre-generated sequence to a binary data sequence.

In operation 1820, the transmitter may convert the ternary sequence to a first signal.

The description made above with reference to FIGS. 1 through 15 may be applicable to the transmission method of FIG. 18, and a further description related thereto will be omitted.

Figure 19:
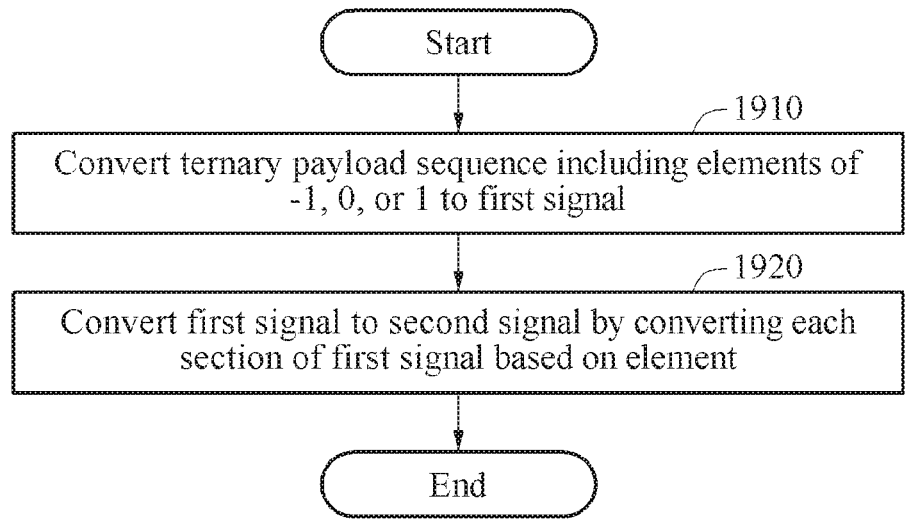
FIG. 19 is a flowchart illustrating a transmission method according to another exemplary embodiment.

FIG. 19 is a flowchart illustrating a transmission method according to another exemplary embodiment.

Referring to FIG. 19, in operation 1910, a transmitter may convert a ternary sequence including elements of −1, 0, or 1 to a first signal.

In operation 1920, the transmitter may convert the first signal to a second signal by applying a different conversion scheme to each section of the first signal based on an element.

The description made above with reference to FIGS. 1 through 15 may be applicable to the transmission method of FIG. 19, and a further description related thereto will be omitted.

FIGS. 20 through 23 are flowcharts illustrating examples of a reception method according to an exemplary embodiment.

Figure 20:
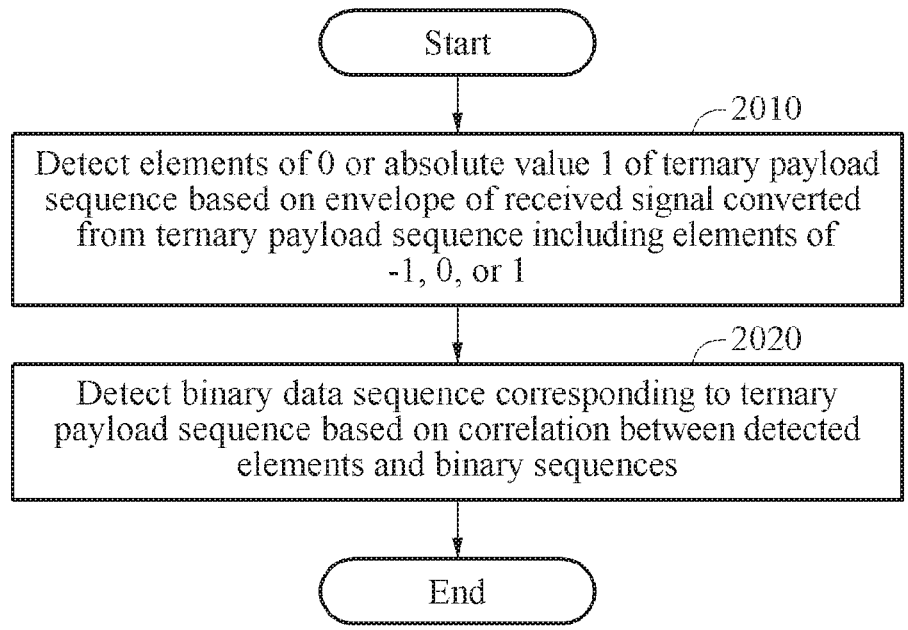
FIGS. 20 through 23 are flowcharts illustrating a reception method according to an exemplary embodiment.

Referring to FIG. 20, in operation 2010, a receiver may detect an amplitude value of an envelope of a received signal converted from a ternary sequence including elements of −1, 0, or 1.

In operation 2020, the receiver may detect a binary data sequence corresponding to the ternary sequence based on a correlation between the detected amplitude value of the envelope and desired binary sequences.

The description made above with reference to FIGS. 1 through 15 may be applicable to the reception method of FIG. 20, and a further description related thereto will be omitted.

Figure 21:
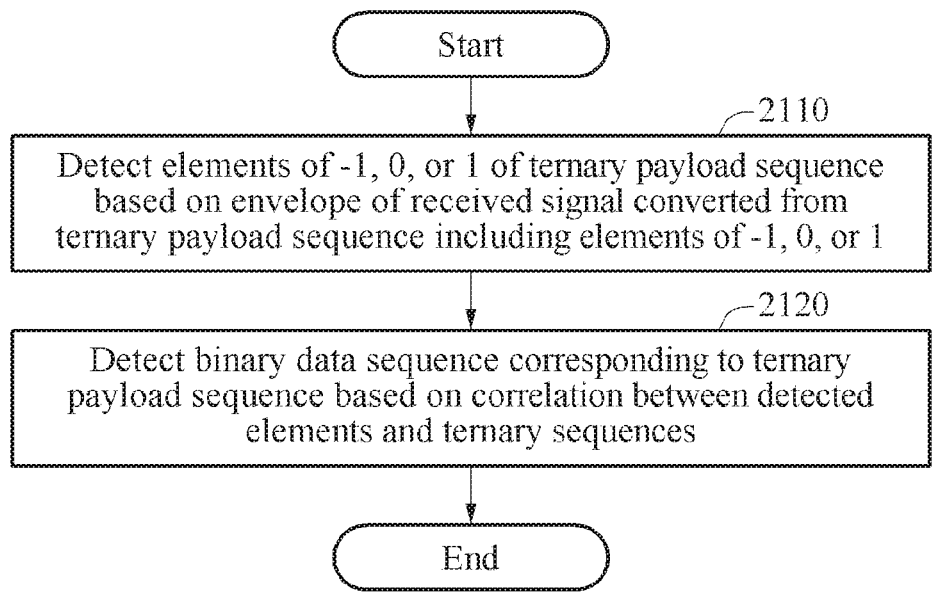

Referring to FIG. 21, in operation 2110, a receiver may detect an amplitude value of an envelope of a received signal converted from a ternary sequence including elements of −1, 0, or 1.

In operation 2120, the receiver may detect a binary data sequence corresponding to the ternary sequence based on a correlation between the detected amplitude value of the envelope and desired ternary sequences.

The description made above with reference to FIGS. 1 through 15 may be applicable to the reception method of FIG. 21, and a further description related thereto will be omitted.

Figure 22:
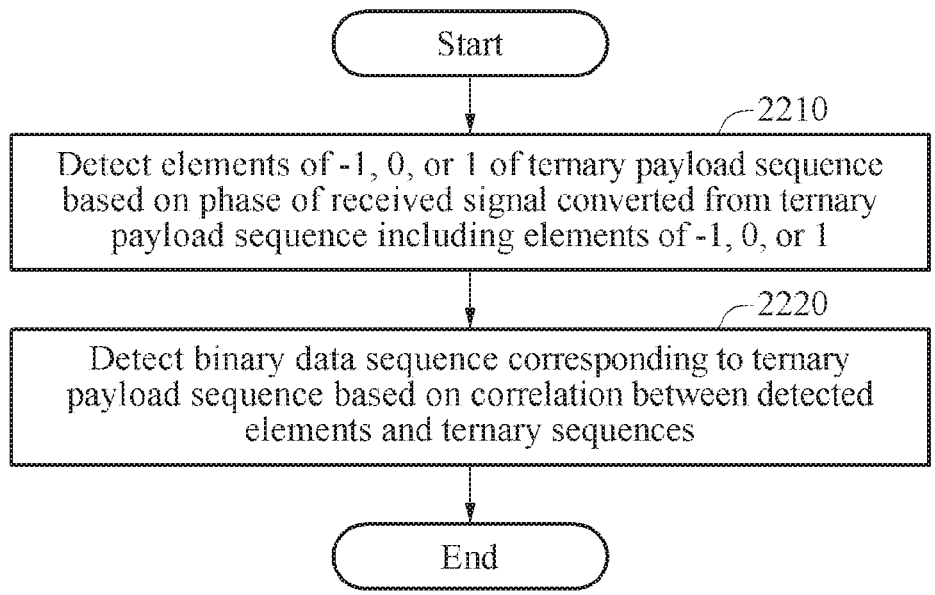

Referring to FIG. 22, in operation 2210, a receiver may detect a correlation between a reference signal and a received signal converted from a ternary sequence including elements of −1, 0, or 1.

In operation 2220, the receiver may detect a binary data sequence corresponding to the ternary sequence based on a result value of the correlation and desired ternary sequences.

The description made above with reference to FIGS. 1 through 15 may be applicable to the reception method of FIG. 22, and a further description related thereto will be omitted.

Figure 23:
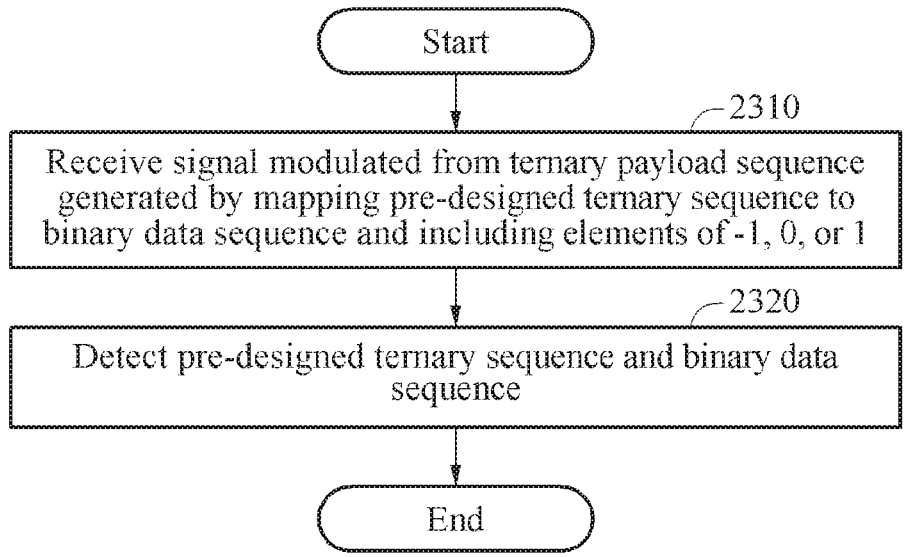

Referring to FIG. 23, in operation 2310, a receiver may receive a signal modulated from a ternary sequence generated by mapping a pre-generated ternary sequence to a binary data sequence and including elements of −1, 0, or 1.

In operation 2320, the receiver may detect the pre-generated ternary sequence and the binary data sequence. Here, the receiver may detect the pre-generated ternary sequence and the binary data sequence using Table 10 and Table 11.

The apparatuses described herein may be implemented using hardware components, software components, and/or combination of the hardware components and the software components. For example, the apparatuses and the components may be configured using at least one universal computer or special purpose computer, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

Although exemplary embodiments are described with reference to some exemplary embodiments and drawings, it will be apparent to one of ordinary skill in the art that various modifications and alterations may be made from the description. For example, suitable results may be achieved if the described techniques are performed in a different order, and/or if components in a described system, architecture, device, or circuit are combined in a different manner, and/or replaced or supplemented by other components or their equivalents.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An operating method of a transmitter comprising:
generating chip sequence, the chip sequence comprising a sequence corresponding to a preamble field, a sequence corresponding to a spread Start Frame Delimiter (SFD) field, a sequence corresponding to a spread PHysical layer Header (PHR) field, and a sequence corresponding to data based on a Physical Service Data Unit (PSDU) field; and
modulating the chip sequence using an Amplitude Shift Keying (ASK) to generate a modulated signal, wherein an amplitude of a n-th chip of the chip sequence is +A when the n-th chip is "1", an amplitude of the n-th chip is "0" when the n-th chip is "0", and an amplitude of the n-th chip is −A when the n-th chip is "−1", the A being a transmit voltage level.

2. The operating method of claim 1, wherein a PHR field comprises information about a modulation scheme and a header check sequence (HCS).

3. The operating method of claim 2, wherein the modulation scheme is a 3/8 ternary amplitude shift keying (TASK).

4. The operating method of claim 2, wherein the modulation scheme is a 5/32 ternary amplitude shift keying (TASK).

5. A transmitter comprising:
a processor configured to:
generate chip sequence, the chip sequence comprising a sequence corresponding to a preamble field, a sequence corresponding to a spread Start FrameDelimiter (SFD) field, a sequence corresponding to a spread PHysical layer Header (PHR) field, and a sequence corresponding to data based on a Physical Service Data Unit (PSDU) field; and
modulate the chip sequence using an Amplitude Shift Keying (ASK) to generate a modulated signal, wherein an amplitude of a n-th chip of the chip sequence is +A when the n-th chip is "1", an amplitude of the n-th chip is "0" when the n-th chip is "0", and an amplitude of the n-th chip is −A when the n-th chip is "−1", the A being a transmit voltage level.

6. The transmitter of claim 5, wherein a PHR field comprises information about a modulation scheme and a header check sequence (HCS).

7. The transmitter of claim 6, wherein the modulation scheme is a ⅜ ternary amplitude shift keying (TASK).

8. The transmitter of claim 6, wherein the modulation scheme is a 5/32 ternary amplitude shift keying (TASK).

9. The operating method of claim 1, wherein the generating comprises mapping each of data symbols to a sequence of chips.

10. The operating method of claim 9, wherein a set of the sequence of the chips comprises a ternary sequence $c_0$ and a ternary sequence $c_m$, the $c_m$ being cyclic shifted from the $c_0$ by m locations, the m being an integer.

11. The operating method of claim 10, wherein a modulation scheme is a ⅜ TASK, where the $c_0$ is {0 0 0 1 −1 0 1 1}.

12. The operating method of claim 10, wherein a modulation scheme is a 5/32 TASK, where the $c_0$ is {−1 0 0 1 0 1 −1 0 −1 −1 1 −1 0 1 0 1 0 0 0 1 0 0 1 1 −1 0 0 0 0 0 1 1}.

13. The operating method of claim 1, wherein the modulated signal is represented as follows:

$$x_{PB}(t) = \left[ A \sum_{n=1}^{N_{PPDU}} d(n)g(t - nT_{chip}) \right] \cos(\omega_c t + \phi),$$

where A denotes the transmit voltage level, d(n) are chips of the chip sequence, $T_{chip}$ denotes a chip duration, $N_{PPDU}$ denotes the number of chips in the chip sequence, g(t) denotes an output of a pulse shaping, $\omega_c$ denotes an angular frequency, and $\phi$ denotes a random phase.

14. The transmitter of claim 5, wherein the processor is further configured to map each of data symbols to a sequence of chips.

15. The transmitter of claim 14, wherein a set of the sequence of the chips comprises a ternary sequence $c_0$ and a ternary sequence $c_m$, the $c_m$ being cyclic shifted from the $c_0$ by m locations, the m being an integer.

16. The transmitter of claim 15, wherein a modulation scheme is a ⅜ TASK, where the $c_0$ is {0 0 0 1 −1 0 1 1}.

17. The transmitter of claim 15, wherein a modulation scheme is a 5/32 TASK, where the $c_0$ is {−1 0 0 1 0 1 −1 0 −1 −1 1 −1 0 1 0 1 0 0 0 1 0 0 1 1 −1 0 0 0 0 0 1 1}.

18. The transmitter of claim 5, wherein the modulated signal is represented as follows:

$$x_{PB}(t) = \left[ A \sum_{n=1}^{N_{PPDU}} d(n)g(t - nT_{chip}) \right] \cos(\omega_c t + \phi),$$

where A denotes the transmit voltage level, d(n) are chips of the chip sequence, $T_{chip}$ denotes a chip duration, $N_{PPDU}$ denotes the number of chips in the chip sequence, g(t) denotes an output of a pulse shaping, $\omega_c$ denotes an angular frequency, and $\phi$ is a random phase.

* * * * *